(12) United States Patent
Noureldin et al.

(10) Patent No.: US 9,725,652 B2
(45) Date of Patent: Aug. 8, 2017

(54) DELAYED COKING PLANT COMBINED HEATING AND POWER GENERATION

(71) Applicant: Saudi Arabian Oil Company, Dhahran (SA)

(72) Inventors: Mahmoud Bahy Mahmoud Noureldin, Dhahran (SA); Hani Mohammed Al Saed, Jubail Ind. (SA)

(73) Assignee: Saudi Arabian Oil Company, Dhahran (SA)

( * ) Notice: Subject to any disclaimer, the term of this patent is extended or adjusted under 35 U.S.C. 154(b) by 23 days.

(21) Appl. No.: 14/991,706

(22) Filed: Jan. 8, 2016

(65) Prior Publication Data

US 2017/0058202 A1 Mar. 2, 2017

Related U.S. Application Data

(60) Provisional application No. 62/209,188, filed on Aug. 24, 2015.

(51) Int. Cl.
*C10B 57/00* (2006.01)
*H02K 7/18* (2006.01)
(Continued)

(52) U.S. Cl.
CPC ............... *C10B 57/00* (2013.01); *C10B 3/02* (2013.01); *C10B 5/10* (2013.01); *C10B 55/00* (2013.01);
(Continued)

(58) Field of Classification Search
CPC C10B 57/00; C10B 55/00; C10B 3/02; C10B 5/10; H02K 7/1823; F22D 1/36;
(Continued)

(56) References Cited

U.S. PATENT DOCUMENTS 3,995,428 A * 12/1976 Roberts ................. F01K 21/005
60/641.2
4,109,469 A 8/1978 Carson
(Continued)

FOREIGN PATENT DOCUMENTS

CN 1844325 10/2006
CN 101424453 5/2009
(Continued)

OTHER PUBLICATIONS

Feng Xu, D. Yogi Goswami and Sunil S. Bhagwat, "A combined power/cooling cycle," Energy, 25 (2000), 233-246.
(Continued)

*Primary Examiner* — Mark Laurenzi
*Assistant Examiner* — Shafiq Mian
(74) *Attorney, Agent, or Firm* — Fish & Richardson P.C.

(57) ABSTRACT

A system includes a heat exchange system and a power generation system. The heat exchange system includes first, second, and third heat exchangers each operable as a continuous source of heat from a delayed coking plant. The first and second heat exchangers heat first and second fluid streams to produce heated first and second fluid streams, respectively. The heated second fluid stream has a lower temperature and a greater quantity of heat than the heated first fluid stream. The third heat exchanger heats a third fluid stream to produce a heated third fluid stream that includes the heated first fluid stream and a hot fluid stream. The heated third fluid stream has a lower temperature than the heated first fluid stream. The power generation system generates power using heat from the heated second and third fluid streams.

35 Claims, 17 Drawing Sheets

(51) Int. Cl.

| | |
|---|---|
| *F01K 3/12* | (2006.01) |
| *F01K 25/08* | (2006.01) |
| *F01K 13/02* | (2006.01) |
| *C10B 55/00* | (2006.01) |
| *C10B 3/02* | (2006.01) |
| *C10B 5/10* | (2006.01) |
| *C10G 9/00* | (2006.01) |
| *F01K 3/18* | (2006.01) |
| *F01K 13/00* | (2006.01) |
| *C10B 57/04* | (2006.01) |

(52) U.S. Cl.
CPC ............ *C10B 57/045* (2013.01); *C10G 9/005* (2013.01); *F01K 3/12* (2013.01); *F01K 3/185* (2013.01); *F01K 13/006* (2013.01); *F01K 13/02* (2013.01); *F01K 25/08* (2013.01); *H02K 7/1823* (2013.01)

(58) Field of Classification Search
CPC . F23J 15/006; F23L 15/02; F01K 3/12; F01K 25/08; F01K 13/02; Y10S 122/02; Y02E 20/348
See application file for complete search history.

(56) References Cited

U.S. PATENT DOCUMENTS

| | | | |
|---|---|---|---|
| 4,291,232 A | 9/1981 | Cardone | |
| 4,471,619 A | 9/1984 | Nolley, Jr. | |
| 4,512,155 A | 4/1985 | Sheinbaum | |
| 4,792,390 A | 12/1988 | Staggs | |
| 4,962,238 A | 10/1990 | Wolfe | |
| 5,007,240 A | 4/1991 | Ishida | |
| 5,164,070 A * | 11/1992 | Munro | C10G 49/22 208/100 |
| 5,240,476 A * | 8/1993 | Hegarty | B01D 53/1418 60/772 |
| 5,497,624 A | 3/1996 | Amir | |
| 5,557,936 A * | 9/1996 | Drnevich | F01K 25/065 252/67 |
| 6,733,636 B1 | 5/2004 | Heins | |
| 8,046,999 B2 * | 11/2011 | Doty | F01K 3/12 60/646 |
| 8,656,720 B1 * | 2/2014 | Hardgrave | F01K 7/34 60/641.2 |
| 9,328,634 B2 | 5/2016 | Ikegami | |
| 9,562,201 B2 | 2/2017 | Noureldin | |
| 2006/0010872 A1 | 1/2006 | Singh | |
| 2008/0128134 A1 | 6/2008 | Mudunuri | |
| 2008/0174115 A1 | 7/2008 | Lambirth | |
| 2008/0257413 A1 | 10/2008 | Noureldin et al. | |
| 2008/0289588 A1 * | 11/2008 | Van Wees | F01K 13/00 122/406.1 |
| 2008/0314726 A1 | 12/2008 | Choros | |
| 2009/0000299 A1 | 1/2009 | Ast | |
| 2009/0000906 A1 * | 1/2009 | Petri | C10G 11/18 196/139 |
| 2009/0071652 A1 | 3/2009 | Vinegar | |
| 2009/0225929 A1 | 9/2009 | Genta et al. | |
| 2009/0287029 A1 | 11/2009 | Anumakonda et al. | |
| 2009/0301087 A1 | 12/2009 | Borissov et al. | |
| 2010/0146974 A1 | 6/2010 | Ast | |
| 2010/0242476 A1 | 9/2010 | Ast | |
| 2010/0263380 A1 * | 10/2010 | Biederman | F01K 23/065 60/651 |
| 2010/0319346 A1 | 12/2010 | Ast | |
| 2010/0326076 A1 | 12/2010 | Ast | |
| 2011/0016863 A1 | 1/2011 | Ernst | |
| 2011/0072819 A1 | 3/2011 | Silva | |
| 2011/0072820 A1 | 3/2011 | Finkenrath | |
| 2011/0083437 A1 | 4/2011 | Ast | |
| 2011/0158858 A1 | 6/2011 | Alves | |
| 2012/0031096 A1 | 2/2012 | Acikgoz et al. | |
| 2012/0047889 A1 | 3/2012 | Acikgoz et al. | |
| 2012/0085096 A1 | 4/2012 | Penton et al. | |
| 2012/0131921 A1 * | 5/2012 | Held | F01K 25/08 60/671 |
| 2012/0279728 A1 | 11/2012 | Northrop | |
| 2012/0279900 A1 | 11/2012 | Noureldin et al. | |
| 2012/0285169 A1 | 11/2012 | Freund | |
| 2012/0298552 A1 * | 11/2012 | Koseoglu | C10B 55/00 208/95 |
| 2013/0104546 A1 | 5/2013 | Goswami | |
| 2013/0145763 A1 | 6/2013 | Mirmobin et al. | |
| 2013/0165534 A1 | 6/2013 | McComish | |
| 2013/0213040 A1 | 8/2013 | Goswami | |
| 2013/0231909 A1 | 9/2013 | Noureldin | |
| 2013/0238154 A1 | 9/2013 | Noureldin | |
| 2013/0334060 A1 * | 12/2013 | Koseoglu | C25B 1/10 205/637 |
| 2014/0090405 A1 * | 4/2014 | Held | F25B 1/06 62/79 |
| 2014/0260311 A1 | 9/2014 | Berlowitz | |
| 2015/0076831 A1 * | 3/2015 | Giegel | F01K 25/08 290/1 R |
| 2015/0377076 A1 * | 12/2015 | Giegel | F01K 25/08 60/645 |
| 2015/0377079 A1 | 12/2015 | Noureldin | |
| 2016/0045841 A1 | 2/2016 | Kaplan | |

FOREIGN PATENT DOCUMENTS

| | | |
|---|---|---|
| CN | 104560082 | 4/2015 |
| DE | 3731978 | 3/1988 |
| EP | 0292391 | 11/1988 |
| EP | 949318 | 10/1999 |
| EP | 2516326 A1 | 10/2012 |
| FR | 2990990 | 11/2013 |
| SU | 295317 | 10/1977 |
| WO | 97/21786 | 6/1997 |
| WO | WO2004102082 A2 | 11/2004 |
| WO | 2011090553 | 7/2011 |
| WO | WO2012048132 | 4/2012 |
| WO | WO2013055864 | 4/2013 |
| WO | 2014205163 | 12/2014 |

OTHER PUBLICATIONS

D. Zheng, B. Chen, Y. Qi and H. Jin, "Thermodynamic analysis of a novel absorption power/cooling combined cycle," Applied Energy, 83 (2006), 311-323.

Meng Liu, and Na Zhang, "Proposal and analysis of a novel ammonia-water cycle for power and refrigeration cogeneration," Energy, 32 (2007), 961-970.

J.Wang, Y. Dai and L. Gao, "Parametric analysis and optimization for a combined power and refrigeration cycle" Applied Energy, 85 (2008), 1071-1085.

R.V. Padilla, G. Demirkaya, D. Yogi Goswami, E. Stefanakos, and M. A. Rahman, "Analysis of power and cooling cogeneration using ammonia-water mixture," Energy, 35 (2010), 4649-4657.

D. Ayou, J. C. Bruno, R. Saravanan and A. Coronas, "An Overview of Combined Absorption Power and Cooling Cycles," Renewable sustainable energy reviews, 21 (2013), 728-748.

J. Hua, Y. Chen, Y. Wang and A.P. Roskilly, "Thermodynamic analysis of ammonia-water power/chilling cogeneration cycle with low grade waste heat," Applied thermal engineering , 64 (2014), 483-490.

Hasan et al., "First and Second Law Analysis of a New Power and Refrigeration Thermodynamic Cycle using a Solar Heat Source," Pergamon, Solar Energy, vol. 73, No. 5, Nov. 1, 2002, pp. 385-393.

Stecco, "Kalina Cycles: Some Possible Applications and Comments," Proceedings of the American Power Conference, XP 000609703, Jan. 1, 1993, vol. 1, pp. 196-201.

Tamm et al., "Theoretical and Experimental Investigation of an Ammonia-Water Power and Refrigeration Thermodynamic Cycle" Science Direct, Solar Energy, vol. 76, No. 1-3, Jan. 1, 2004, pp. 217-228.

(56) References Cited

OTHER PUBLICATIONS

Sadrameli et al., "Optimum Operating Conditions for a Combined Power and Cooling Thermodynamic Cycle," Science Direct, Applied Energy, vol. 84, No. 3, Nov. 10, 2006, pp. 254-265.
VIDAL, "Analysis of a Combined Power and Refrigeration Cycle by the Exergy Method," Science Direct, Energy 31, Dec. 1, 2006, pp. 3401-3414.
PCT International Search Report and Written Opinion of the International Searching Authority, PCT/US2016/027797, Oct. 19, 2016, 12 pages.
PCT International Search Report and Written Opinion of the International Searching Authority, PCT/US2016/027794, Oct. 19, 2016, 13 pages.
PCT International Search Report and Written Opinion of the International Searching Authority, PCT/US2016/030063, Oct. 19, 2016, 13 pages.
PCT International Search Report and Written Opinion of the International Searching Authority, PCT/US2016/030156, Oct. 19, 2016, 12 pages.
PCT International Search Report and Written Opinion of the International Searching Authority, PCT/US2016/048074, Nov. 9, 2016, 12 pages.
PCT International Search Report and Written Opinion of the International Searching Authority, PCT/US2016/048042, Nov. 9, 2016, 12 pages.
PCT International Search Report and Written Opinion of the International Searching Authority, PCT/US2016/048067, Nov. 15, 2016, 11 pages.
PCT International Search Report and Written Opinion of the International Searching Authority, PCT/US2016/048066, Nov. 15, 2016, 11 pages.
PCT International Search Report and Written Opinion of the International Searching Authority, PCT/US2016/048078, Nov. 15, 2016, 12 pages.
PCT International Search Report and Written Opinion of the International Searching Authority, PCT/US2016/048076, Nov. 15, 2016, 12 pages.
PCT International Search Report and Written Opinion of the International Searching Authority, PCT/US2016/048207, Nov. 21, 2016, 12 pages.
PCT International Search Report and Written Opinion of the International Searching Authority, PCT/US2016/048219, Nov. 21, 2016, 13 pages.
PCT International Search Report and Written Opinion of the International Searching Authority, PCT/US2016/048229, Nov. 21, 2016, 13 pages.
PCT International Search Report and Written Opinion of the International Searching Authority, PCT/US2016/048236, Nov. 21, 2016, 13 pages.
PCT International Search Report and Written Opinion of the International Searching Authority, PCT/US2016/027413, Nov. 22, 2016, 11 pages.
PCT International Search Report and Written Opinion of the International Searching Authority, PCT/US2016/048063, Nov. 23, 2016, 11 pages.
PCT International Search Report and Written Opinion of the International Searching Authority, PCT/US2016/048071, Nov. 23, 2016, 11 pages.
PCT International Search Report and Written Opinion of the International Searching Authority, PCT/US2016/048210, Dec. 22, 2016, 11 pages.
PCT International Search Report and Written Opinion of the International Searching Authority, PCT/US2016/048224, Dec. 22, 2016, 11 pages.
PCT International Search Report and Written Opinion of the International Searching Authority, PCT/US2016/048209, Dec. 22, 2016, 11 pages.
PCT International Search Report and Written Opinion of the International Searching Authority, PCT/US2016/048237, Dec. 22, 2016, 11 pages.
PCT International Search Report and Written Opinion of the International Searching Authority, PCT/US2016/048223, Dec. 22, 2016, 11 pages.
PCT International Search Report and Written Opinion of the International Searching Authority, PCT/US2016/048212, Dec. 22, 2016, 11 pages.
PCT International Search Report and Written Opinion of the International Searching Authority, PCT/US2016/027417, Jul. 6, 2016, 11 pages.

* cited by examiner

DELAYED COKING PLANT COMBINED HEATING AND POWER GENERATION

CLAIM OF PRIORITY

This application claims priority U.S. Provisional Application Ser. No. 62/209,188, filed on Aug. 24, 2015, the entire contents of which are incorporated herein by reference.

BACKGROUND

Delayed coking is a thermal cracking process used in petroleum refineries to upgrade and convert petroleum residuum, bottoms from atmospheric and vacuum distillation of crude oil, into liquid and gas product streams leaving behind a solid concentrated carbon material, known as petroleum coke. Large amounts of waste heat from delayed coking plants is often discharged into the environment.

SUMMARY

In a general aspect, a system includes a heat exchange system and a power generation system. The heat exchange system includes a first heat exchanger operable as a continuous source of heat from a delayed coking plant, the first heat exchanger configured to heat a first fluid stream to produce a heated first fluid stream. The heat exchange system includes a second heat exchanger operable as a continuous source of heat from the delayed coking plant, the second heat exchanger configured to heat a second fluid stream to produce a heated second fluid stream. The heated second fluid stream has a lower temperature and a greater quantity of heat than the heated first fluid stream. The heat exchange system includes a third heat exchanger operable as a continuous source of heat to the delayed coking plant, the third heat exchanger configured to heat a third fluid stream to produce a heated third fluid stream. The third fluid stream includes the heated first fluid stream and a hot fluid stream. The heated third fluid stream has a lower temperature than the heated first fluid stream. The power generation system is configured to generate power using heat from the heated second fluid stream and the heated third fluid stream.

Aspects can include one or more of the following features.

The system includes a fluid storage tank configured to pass the hot fluid stream continuously. The fluid storage tank is configured to receive an intermittent hot stream. The system includes a fourth heat exchanger operable as an intermittent source of heat from the delayed coking plant. The fourth heat exchanger is configured to heat a fourth fluid stream to produce the intermittent hot stream. The intermittent hot stream has a greater quantity of heat than the heated first fluid stream. The intermittent hot stream has a lower temperature than the heated first fluid stream. The fourth heat exchanger recovers heat from an output stream from a coker blowdown tower in the delayed coking plant. The output stream is an intermittent heat source. The output stream includes an overhead stream from the coker blowdown tower. The output stream includes a bottom stream from the coker blowdown tower. The heat exchange system includes multiple fourth heat exchangers each configured to heat a portion of the intermittent fluid stream. Each fourth heat exchanger recovers heat from a corresponding intermittent heat source in the delayed coking plant.

The first heat exchanger recovers heat from a continuous heat source in the delayed coking plant, the continuous heat source having a temperature of at least about 134° C.

The first heat exchanger recovers heat from a bottom stream from a debutanizer in the delayed coking plant. The bottom stream from the debutanizer includes a stabilized naphtha stream.

The first heat exchanger recovers heat from a sponge oil stream from a fractionator in the delayed coking plant.

The first heat exchanger recovers heat from a light coked gas oil product stream from a fractionator in the delayed coking plant.

The first heat exchanger recovers heat from a heavy cracked gas oil product stream from a fractionator in the delayed coking plant.

The heat exchange system includes multiple first heat exchangers each configured to heat a portion of the first fluid stream. Each first heat exchanger recovers heat from a corresponding continuous heat source in the delayed coking plant.

The second heat exchanger recovers heat from a continuous heat source in the delayed coking plant, the continuous heat source having a temperature of less than about 134° C.

The second heat exchanger recovers heat from an overhead stream from a fractionator in the delayed coking plant.

The second heat exchanger recovers heat from an interstage stream of a coker gas compressor in the delayed coking plant.

The second heat exchanger recovers heat from a discharge stream from a coker gas compressor in the delayed coking plant.

The heat exchange system includes multiple second heat exchangers each configured to heat a portion of the second fluid stream. Each second heat exchanger recovers heat from a corresponding continuous heat source in the delayed coking plant.

The temperature of the heated third fluid stream is less than the temperature of the third fluid stream.

The third heat exchanger is configured to heat a stripper bottom product from a stripper in the delayed coking plant by exchange with the third fluid stream.

The third heat exchanger is configured to provide heat to re-boil the stripper bottom product prior to the stripper bottom product being returned to the stripper.

The third heat exchanger is configured to heat a rich sponge oil stream from a sponge absorber in the delayed coking plant by exchange with the third oil stream.

The third heat exchanger is configured to heat the rich sponge oil stream between the sponge absorber and a fractionator in the delayed coking plant.

The heat exchange system includes multiple third heat exchangers each configured to heat a corresponding stream in the delayed coking plant by exchange with a portion of the third fluid stream.

The system includes a coker heat exchanger configured to heat a feed stream into a coker heater by exchange with a pumparound stream.

The power generation system includes an Organic Rankine cycle system.

The power generation system is configured to generate at least about 9 MW of power.

Heat from the heated second fluid stream and the heated third fluid stream is used to heat iso-butane in the power generation system. Power is generated from expansion of iso-butane vapor in the power generation system.

The system includes an accumulation tank. The first fluid stream, the second fluid stream, or both includes fluid from the accumulation tank. The accumulation tank is configured to receive the heated second fluid stream and the heated third fluid stream from the power generation system.

One or more of the first fluid stream, the second fluid stream, or the third fluid stream includes an oil stream.

The system is integrated into the delayed coking plant as a retrofit to the delayed coking plant. One or more existing heat exchangers in the delayed coking plant are no longer used following the retrofit. Following the retrofit, the delayed coking plant uses up to about 13% less in heating utility consumption.

In an aspect, a method includes heating a first fluid stream to produce a heated first fluid stream by exchange with a first continuous source of heat from a delayed coking plant. The method includes heating a second fluid stream to produce a heated second fluid stream by exchange with a second continuous source of heat from the delayed coking plant. The heated second fluid stream has a lower temperature and a greater quantity of heat than the heated first fluid stream. The method includes heating a stream in the delayed coking plant by exchange with a third fluid stream to produce a heated third fluid stream. The third fluid stream includes the heated first fluid stream and a hot fluid stream. The heated third fluid stream has a lower temperature than the heated first fluid stream. The method includes generating power using heat from the heated second fluid stream and the heated third fluid stream.

Aspects can include one or more of the following features.

The method includes continuously passing the hot fluid stream from a fluid storage tank. The method includes receiving an intermittent hot stream at the fluid storage tank. The method includes heating a fourth fluid stream to produce the intermittent hot stream by exchange with an intermittent source of heat from the delayed coking plant. The intermittent hot stream has a greater quantity of heat than the heated first fluid stream. The intermittent hot stream has a lower temperature than the heated first fluid stream. Heating the fourth fluid stream includes heating the third fluid stream using heat recovered from an output stream from a coker blowdown tower in the delayed coking plant. The output stream includes a stripper bottom product from a stripper in the delayed coking plant by exchange with the fourth fluid stream. The output stream includes a rich sponge oil stream from a sponge absorber in the delayed coking plant by exchange with the fourth fluid stream.

Heating the first fluid stream includes heating the first fluid stream using heat recovered from a bottom stream from a debutanizer in the delayed coking plant.

Heating the first fluid stream includes heating the first fluid stream using heat recovered a sponge oil stream from a fractionator in the delayed coking plant.

Heating the first fluid stream includes heating the first fluid stream using heat recovered from a light coked gas oil product stream from a fractionator in the delayed coking plant.

Heating the first fluid stream includes heating the first fluid stream using heat recovered from a heavy cracked gas oil product stream from a fractionator in the delayed coking plant.

Heating the second fluid stream includes heating the second fluid stream using heat recovered from an overhead stream from a fractionator in the delayed coking plant.

Heating the second fluid stream includes heating the second fluid stream using heat recovered from an inter-stage stream and by exchange with a discharge stream of a coker gas compressor in the delayed coking plant.

Heating a stream in the delayed coking plant includes heating a stripper bottom product from a stripper in the delayed coking plant.

Heating a stream in the delayed coking plant includes heating a rich sponge oil stream from a sponge absorber in the delayed coking plant.

The method includes heating a feed stream into a coker heater in the delayed coking plant by exchange with a fluid pumparound stream.

Generating power includes generating power using an Organic Rankine cycle system.

Generating power includes generating at least about 9 MW of power.

Generating power includes heating iso-butane using heat from the heated second fluid stream and the heated fourth fluid stream and expanding iso-butane vapor to generate power.

The method includes returning the heated second fluid stream and the heated third fluid stream to an accumulation tank.

One or more of the first fluid stream, the second fluid stream, or the third fluid stream includes an oil stream.

The systems and methods described here can have one or more of the following advantages. The combined heat and power system described here is a combination of heat exchange components, heat storage components, and heat-to-power conversion components that can be integrated into a delayed coking plant to enable more efficient operation of the delayed coking plant. The number of heat exchangers used in the delayed coking plant can be reduced by feeding recovered waste heat back into the delayed coking plant using networks of heat exchangers in the combined heat and power system. The recovered waste heat can be used for heating and cooling in the delayed coking plant, thus enabling a reduction in consumption of heating or cooling utilities by the delayed coking plant. Waste heat and greenhouse gases released into the environment can be reduced by the recovery and reuse of waste heat by the combined heat and power system.

The combined heat and power system described here can enable carbon-free power generation using waste heat recovered from the delayed coking plant. For instance, up to about 9 MW of power can be generated using recovered waste heat.

The combined heat and power system described can be integrated into an existing delayed coking plant as a retrofit or can be integrated into a newly constructed delayed coking plant. A retrofit to an existing delayed coking plant allows the efficiency and power generation advantages offered by the combined heat and power system to be accessible with a low-capital investment. The combined heat and power system can make use of existing structure in a delayed coking plant while still enabling efficient waste heat recovery and conversion of waste heat to power. The integration of a combined heat and power system into an existing delayed coking plant can be generalizable to plant-specific operating modes.

Other features and advantages are apparent from the following description and from the claims.

DETAILED DESCRIPTION

Figure 1:
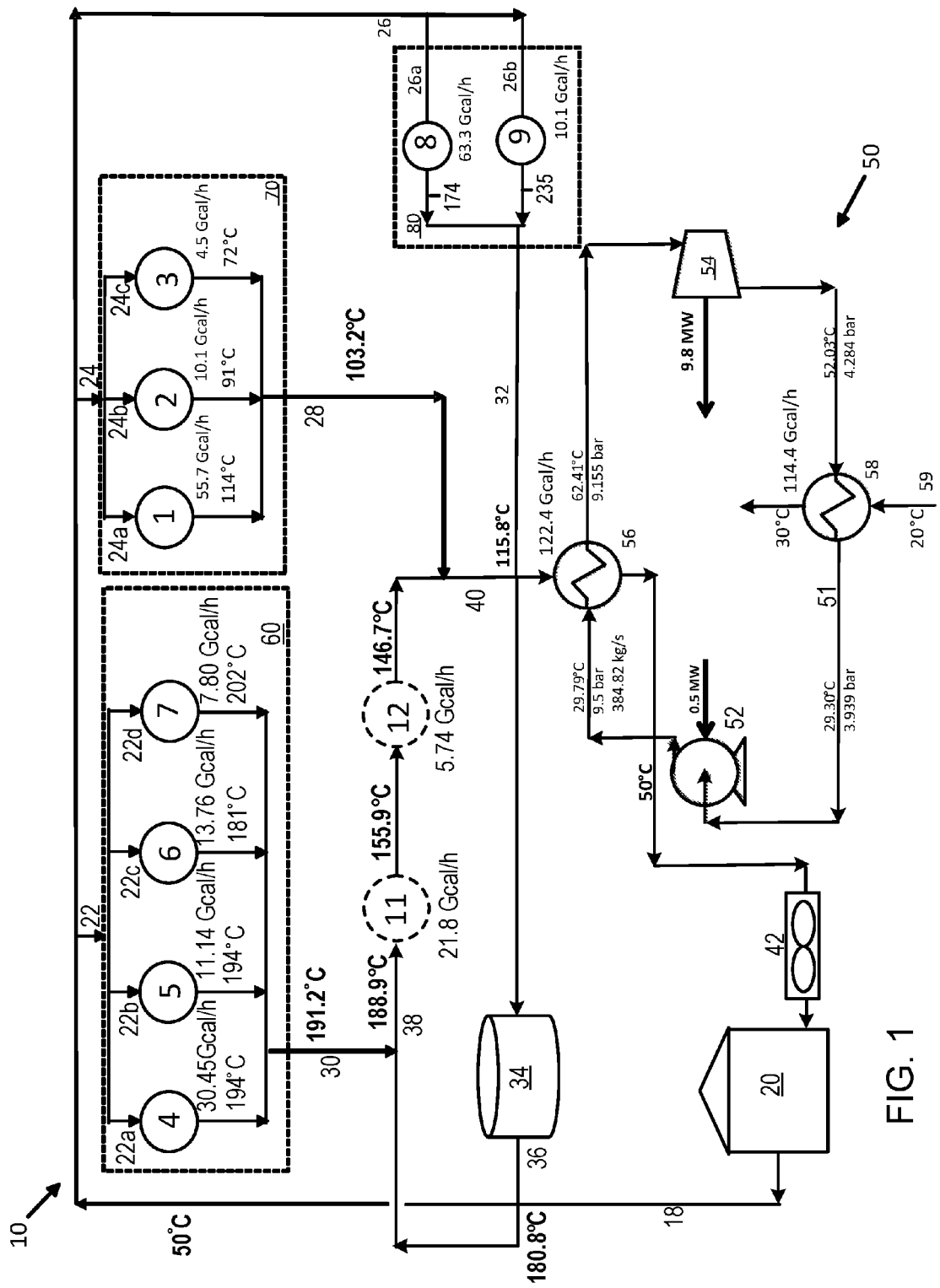
FIG. 1 is a diagram of a combined heat and power system.

We describe here a combined heat and power generation system for use with a delayed coking plant. Networks of heat exchangers recover both high-grade and low-grade waste heat from the delayed coking plant. The recovered waste heat is fed back into the delayed coking plant for intra-plant heating and cooling, thus saving energy that would otherwise have been used for heating and cooling within the delayed coking plant and allowing the delayed coking plant to operate more efficiently. For instance, the combined heat and power generation system can reduce the consumption of heating utilities by up to about 13% (about 85 MM Btu/h). The recovered waste heat is also used to power a power generation system such as an Organic Rankine cycle system, enabling the generation of up to about 9 MW of carbon-free power. The combined heat and power generation system described here can be implemented as a retrofit to an existing delayed coking plant and thus is accessible as a low-capital, energy-saving investment that is compatible with existing structures. The combined heat and power generation system can also be integrated into a newly constructed delayed coking plant.

Delayed coking is a thermal cracking process used in petroleum refineries to upgrade and convert petroleum residuum, bottoms from atmospheric and vacuum distillation of crude oil, into liquid and gas product streams. Delayed coking leaves behind a solid, concentrated carbon material known as petroleum coke. Delayed coking can produce three physical structures of petroleum coke: shot coke, sponge coke, and needle coke. Depending on the physical structure and chemical properties of the petroleum coke, the coke can be burned as a fuel, calcined for use, for example, in aluminum or steel industrial applications, or gasified to produce syngas, steam, $H_2$, or power.

A network of heat exchangers incorporated into a delayed coking plant can recover both high-grade and low-grade waste heat from the delayed coking plant. Low-grade waste heat is waste heat that is below, for instance, 134° C.; high grade waste heat is waste heat that is above, for instance, 134° C. The waste heat recovered by the network of heat exchangers is fed back into the delayed coking plant for intra-plant heating and cooling, thus saving energy that would otherwise have been used for intra-plant heating and cooling. For instance, using waste heat for intra-plant heating and cooling can help to reduce the fuel consumption of a coker furnace or reduce the consumption of medium pressure steam by the delayed coking plant or both, thus enabling more efficient operation of the delayed coking plant. The waste heat is also used to power a power generation system, for example, a carbon-free power generation system such as an Organic Rankine cycle (ORC) system. Power generated by the power generation system can be used locally (for example, at the delayed coking plant) or exported to an electricity grid. The network of heat exchangers can be implemented as a retrofit to an existing delayed coking plant or can be included in a newly constructed delayed coking plant (sometimes referred to as a grassroots delayed coking plant).

Referring to FIG. 1, in a combined heat and power system 10, networks of heat exchangers recover both high-grade and low-grade waste heat from a delayed coking plant. In the combined heat and power system 10, a heating fluid stream 18, such as a stream of oil, water, an organic fluid, or another fluid, recovers heat from several continuous and intermittent sources of waste heat in the delayed coking plant by exchange via exchangers 1-9. Portions of heating fluid stream 18, heated by exchange with sources of waste heat in the delayed coking plant, can be used for intra-plant heating within the delayed coking plant. A heating fluid stream 40, heated by exchange with sources of waste heat in the delayed coking plant, is provided to power generation system 50 to act as a heat source for power generation.

In operation, heating fluid stream 18 is flowed through the heat exchangers 1-9. An inlet temperature of the heating fluid that is flowed into the inlets of each of heat exchangers 1-9 is substantially the same, for example, 50° C. Each heat exchanger 1-9 heats the heating fluid to a respective temperature that is greater than the inlet temperature. The heated heating fluids from heat exchangers 1-9 are combined and flowed through power generation system 50. Heat from the heated heating fluid heats the working fluid of the ORC thereby increasing the working fluid pressure and temperature. The heat exchange with the working fluid results in a decrease in the temperature of the heating fluid. The heating fluid is then collected in an accumulation tank 20 and can be pumped back through heat exchangers 1-9 to restart the waste heat recovery cycle.

The heating fluid circuit to flow heating fluid through heat exchangers 1-9 can include multiple valves that can be operated manually or automatically. For example, the delayed coking plant can be fitted with the heating fluid flow pipes and valves. An operator can manually open each valve in the circuit to cause the heating fluid to flow through the circuit. To cease waste heat recovery, for example, to perform repair or maintenance or for other reasons, the operator can manually close each valve in the circuit. Alternatively, a control system, for example, a computer-controlled control system, can be connected to each valve in the circuit. The control system can automatically control the valves based, for example, on feedback from sensors (for example, temperature, pressure or other sensors), installed at different locations in the circuit. The control system can also be operated by an operator.

Heating fluid is stored in an accumulation tank 20 at, for example, 50° C., and leaves accumulation tank 20 as heating fluid stream 18. A first portion 22 of heating fluid stream 18 feeds a first sub-network 60 of heat exchangers 4, 5, 6, 7

(sometimes referred to as sub-network A) that recover high-grade waste heat from continuous sources of high-grade heat in the delayed coking plant. A second portion 24 of heating fluid stream 18 feeds a second sub-network 70 of heat exchangers 1, 2, 3 (sometimes referred to as a sub-network B) that recover low-grade waste heat from continuous sources of low-grade heat in the delayed coking plant. A third portion 26 of heating fluid stream 18 feeds a third sub-network 80 of heat exchangers 8, 9 (sometimes referred to as sub-network C) that recover waste heat from intermittent sources of heat in the delayed coking plant.

Figure 6:
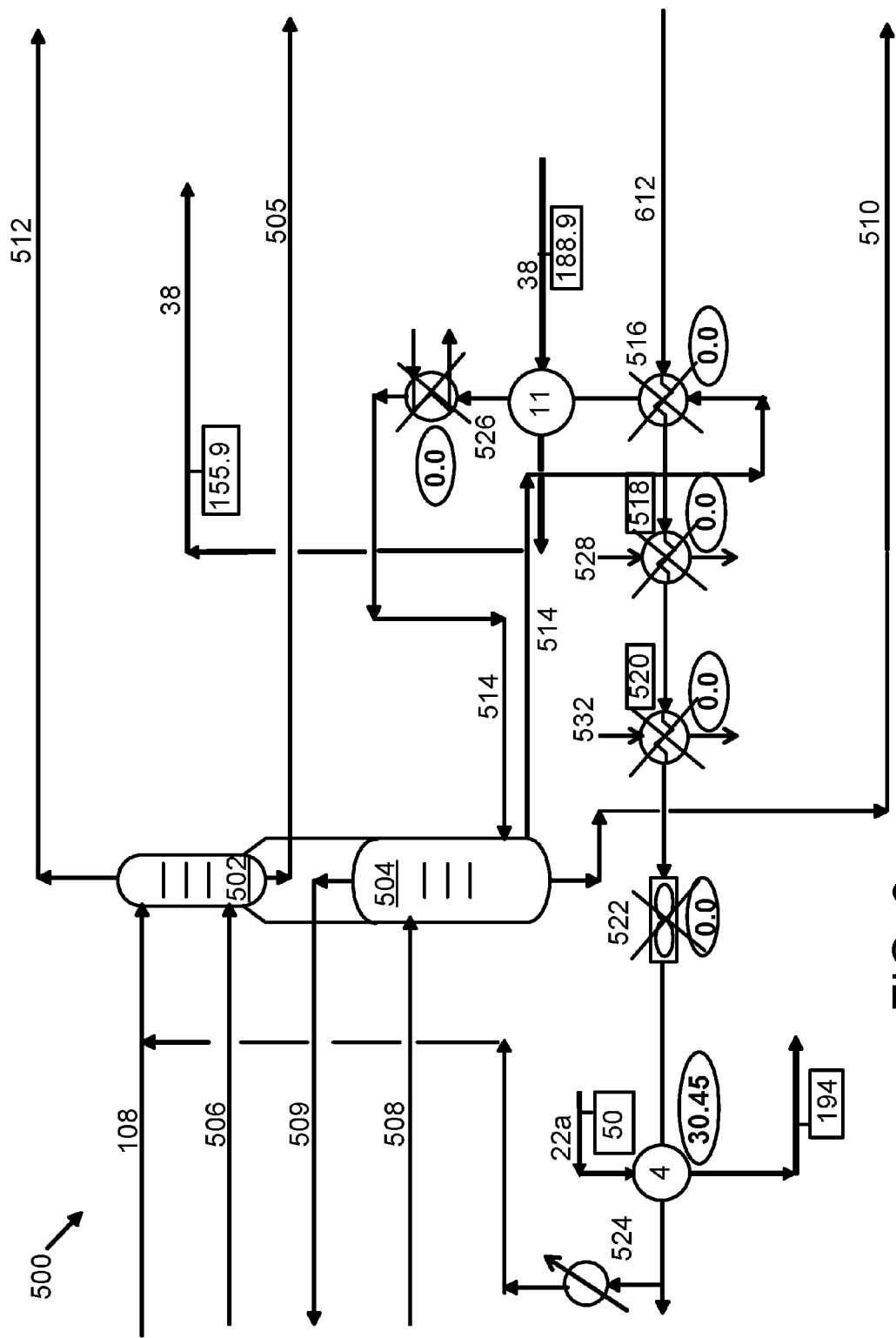
FIG. 6 is a diagram of a retrofit of an absorber-stripper section of a delayed coking plant.
Figure 15:
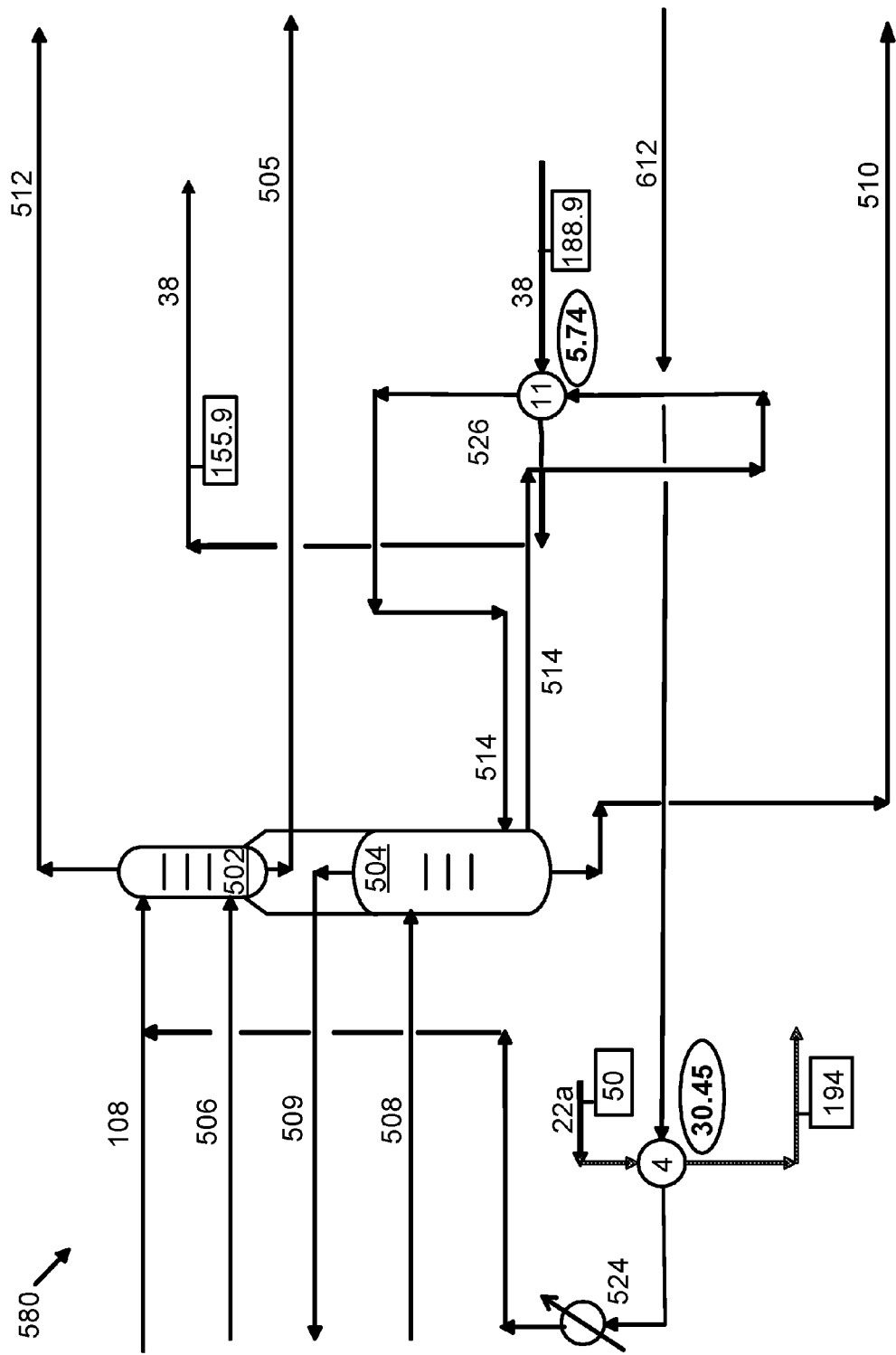
FIG. 15 is a diagram of a grassroots absorber-stripper section of a delayed coking plant.

In sub-network A 60, a heating fluid sub-stream 22a recovers waste heat from a stabilized naphtha stream 612 from the bottom of a debutanizer 605 via heat exchanger 4 in an absorber-stripper section 500, 580 of the delayed coking plant (see, for example, FIGS. 6 and 15). A heating fluid sub-stream 22b recovers waste heat from lean sponge oil 118 via heat exchanger 5 in a sponge absorber section 600, 680 of the delayed coking plant (see, for example, FIGS. 7 and 16). A heating fluid sub-stream 22c recovers waste heat from a light coked gas oil (LCGO) product 132 via heat exchanger 6 in a rundown cooler section 800, 880 of the delayed coking plant (see, for example, FIGS. 9 and 17). A heating fluid sub-stream 22d recovers waste heat from a heavy cracked gas oil (HCGO) product 704 (see, for example, FIGS. 9 and 17) via heat exchanger 7 in the rundown cooler section 800, 880. Heating fluid sub-streams 22a, 22b, 22c, 22d are combined into a heating fluid header 30.

Figure 2:
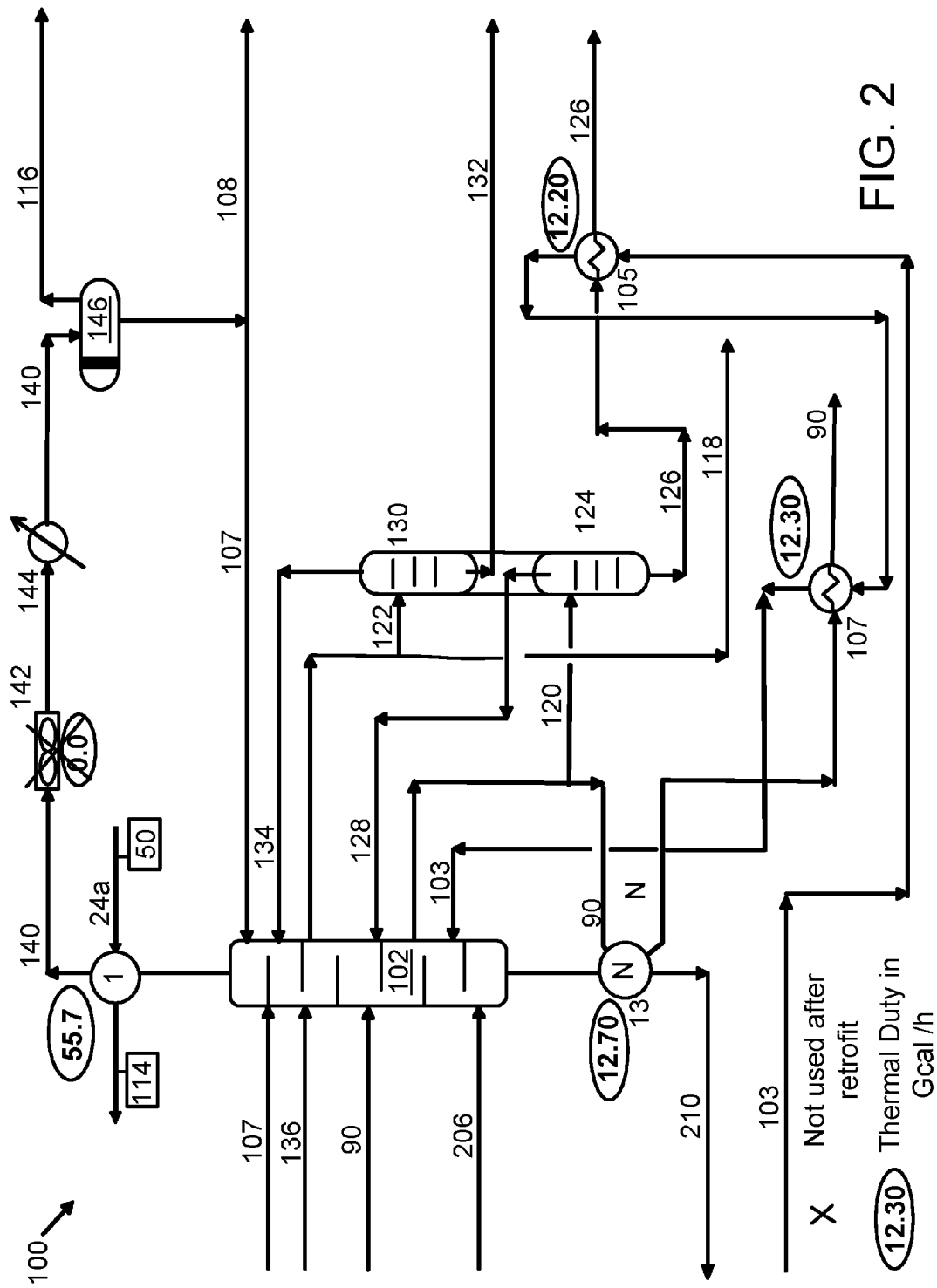
FIG. 2 is a diagram of a retrofit of a fractionation section of a delayed coking plant.
Figure 11:
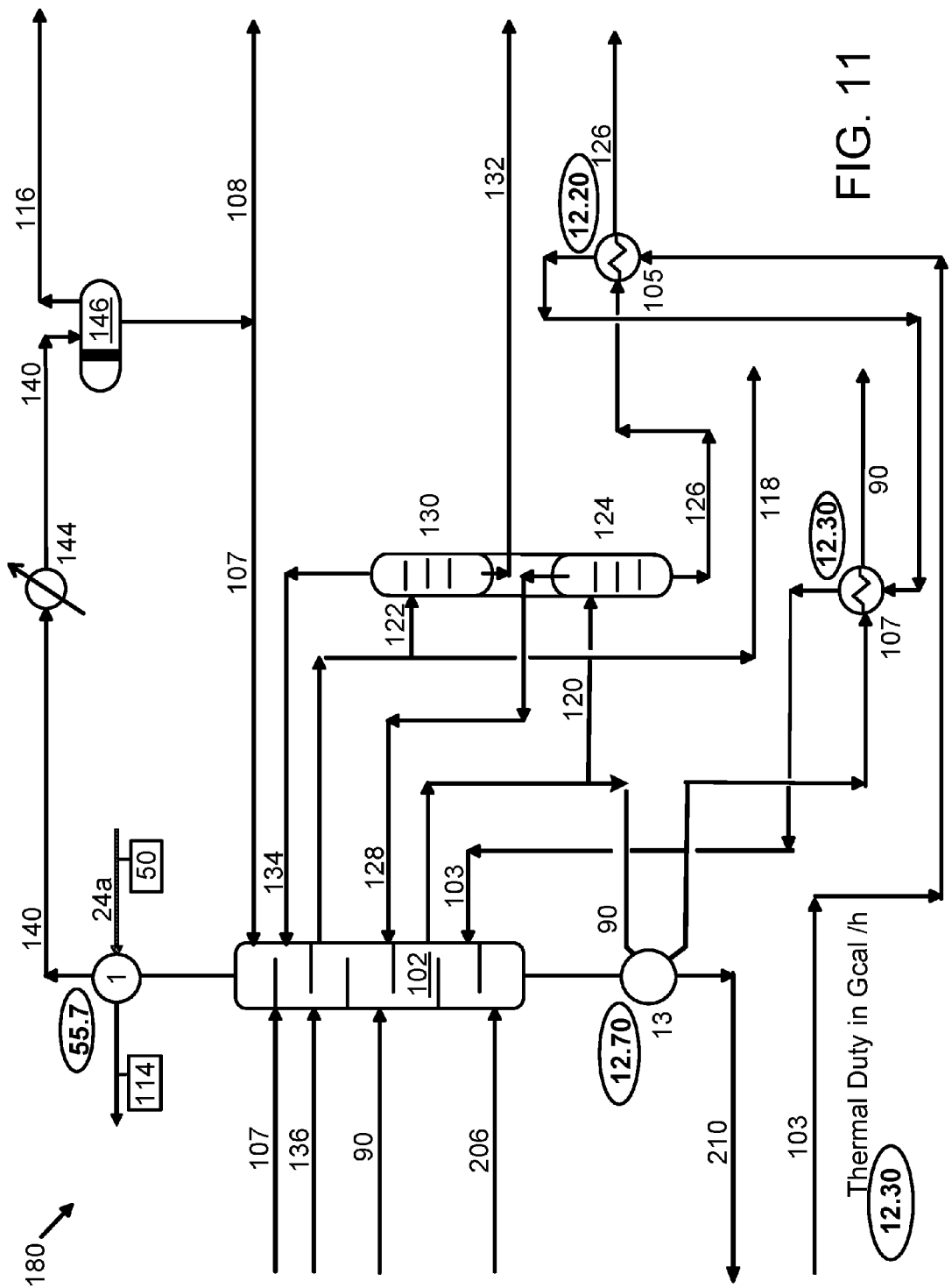
FIG. 11 is a diagram of a grassroots fractionation section of a delayed coking plant.

In sub-network B 70, a heating fluid sub-stream 24a recovers waste heat from a fractionator overhead stream 140 via heat exchanger 1 in a fractionation section 100, 180 of the delayed coking plant (see, for example, FIGS. 2 and 11). A heating fluid sub-stream 24b recovers waste heat from a compressor inter-stage stream 408 via heat exchanger 2 in an overhead gas compression system 400, 480 of the delayed coking plant (see, for example, FIGS. 5 and 14). A heating fluid sub-stream 24c recovers waste heat from a compressor discharge stream 416 via heat exchanger 3 in the overhead gas compression system 400, 480. Heating fluid sub-streams 24a, 24b, 24c are combined into a heating fluid header 28.

Figure 4:
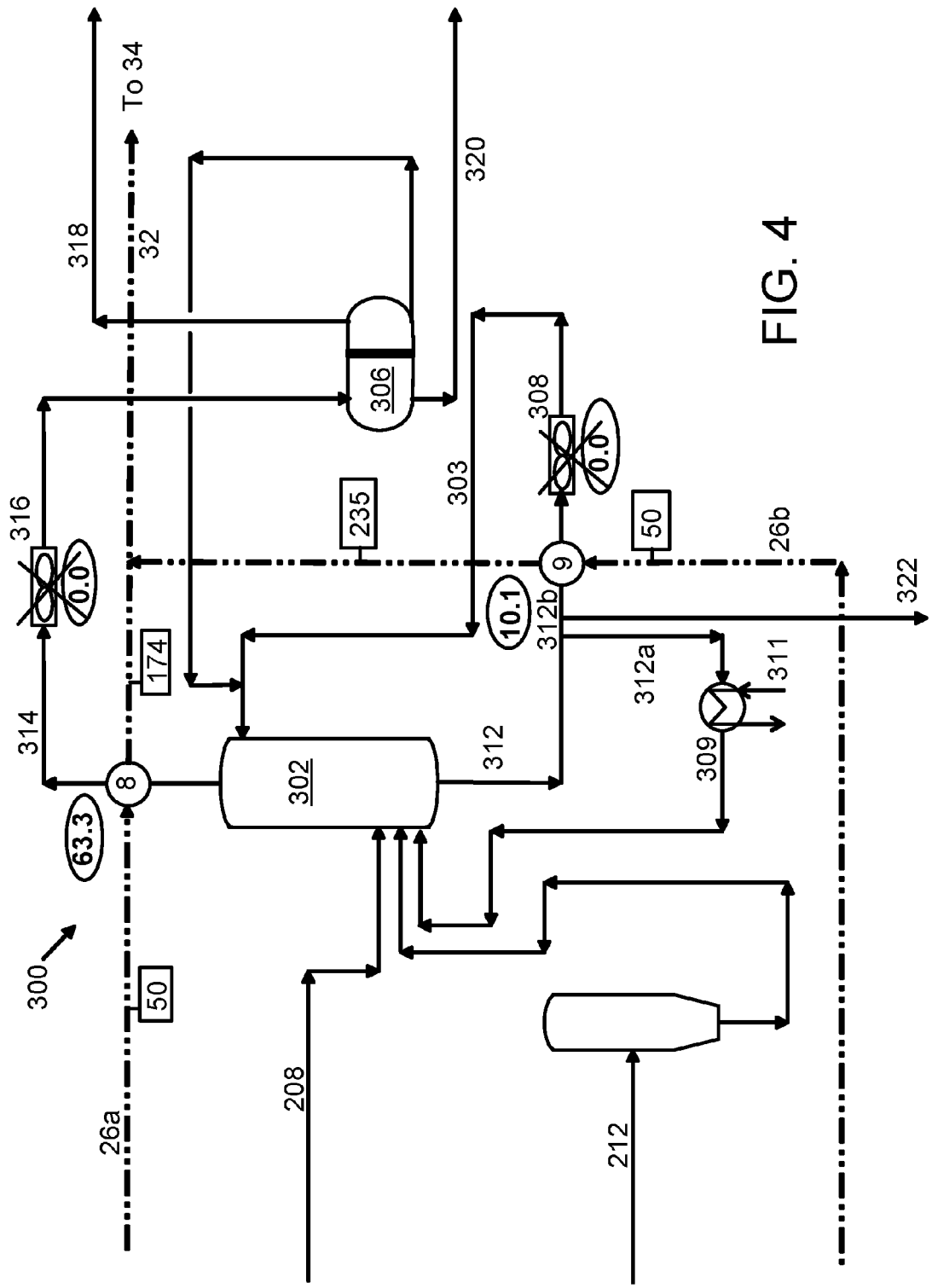
FIG. 4 is a diagram of a retrofit of a blowdown section of a delayed coking plant.
Figure 13:
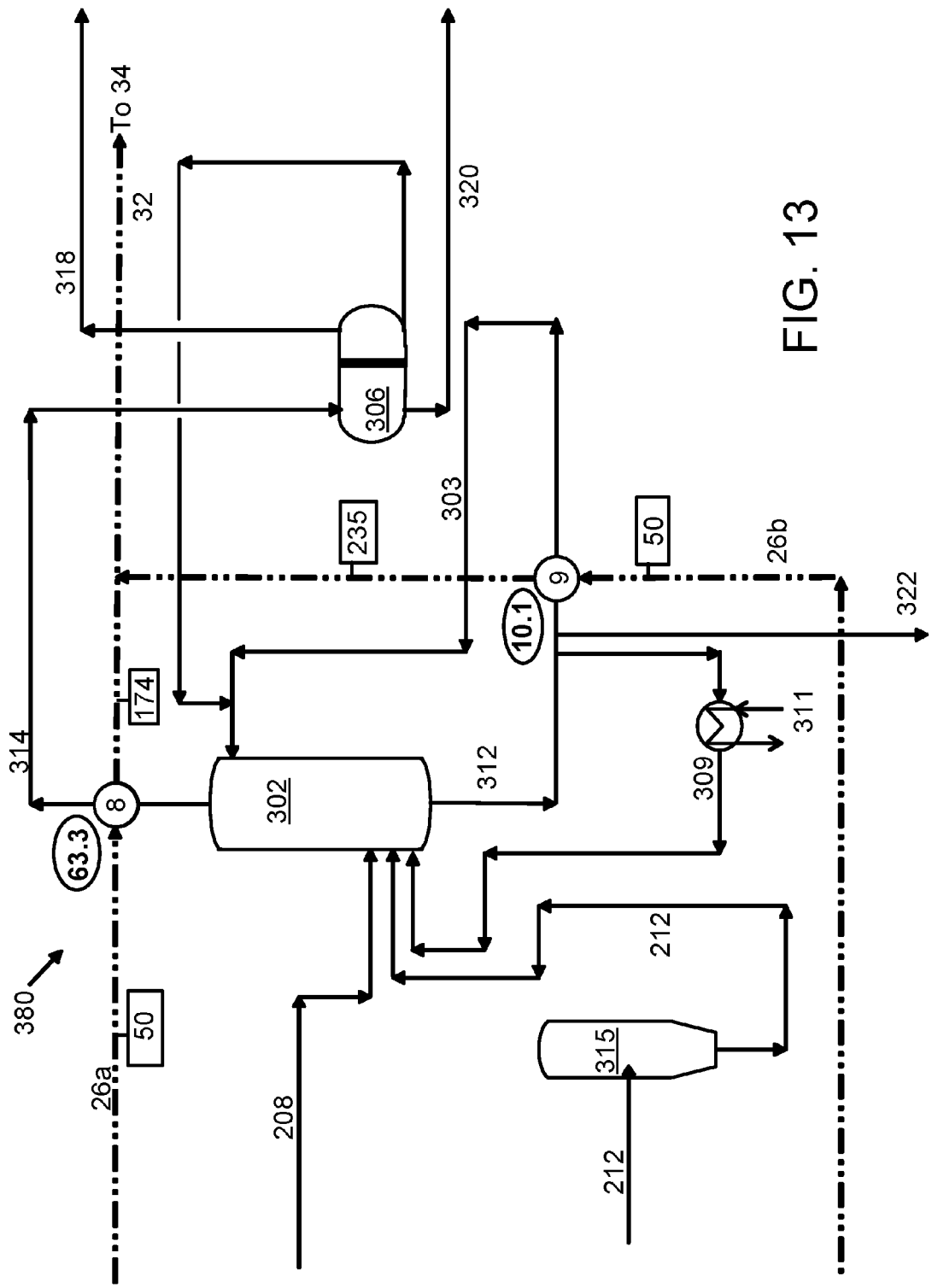
FIG. 13 is a diagram of a grassroots blowdown section of a delayed coking plant.

In sub-network C 80, heat exchangers 8 and 9 enable waste heat to be recovered from intermittent hot sources in a blowdown section 300, 380 (see, for example, FIGS. 4 and 13). A heating fluid sub-stream 26a recovers waste heat from a coker blowdown tower overhead stream 314 via heat exchanger 8. A heating fluid sub-stream 26b recovers waste heat from a coker blowdown tower bottom stream 312 via heat exchanger 9. Heating fluid sub-streams 26a, 26b heated from the intermittent hot sources are combined into an intermittent header 32 with a temperature of, for example, about 180° C.

Because of the intermittent nature of heat exchangers 8, 9, there can be times during the operation of combined heat and power system 10 in which neither heat exchanger 8, 9 is operating, times in which only one of heat exchangers 8, 9 is operating, and times in which both heat exchangers 8, 9 are operating. In some cases, the operations of heat exchanger 8 and heat exchanger 9 at least partially overlap such that both heat exchangers 8, 9 are operating at the same time. When neither heat exchanger 8, 9 is operating, the flow of third portion 26 of heating fluid stream 18 can be halted. When both heat exchangers 8, 9 are operating, the flow of third portion 26 of heating fluid stream 18 can be at a maximum level. When only one heat exchanger 8, 9 is operating, the flow of third portion 26 of heating fluid stream 18 can be at a level less than the maximum level.

Heating fluid from intermittent header 32 is stored in a thermal storage tank 34, for example, an insulated tank with a one-day capacity. Thermal storage tank 34 can use hot oil, molten salt, or another medium for thermal storage. Thermal storage tank 34 collects the intermittent waste heat from intermittent header 32 and continuously or periodically discharges a heating fluid stream 36, for example, on an hourly basis or at another interval. In some cases, multiple thermal storage tanks 34 can be used, such as two thermal storage tanks 34. One of the thermal storage tanks 34 can be discharging heating fluid into heating fluid stream 36 while the other of the thermal storage tanks 34 is receiving heating fluid from intermittent header 32. The temperature of the heating fluid from intermittent header 32 flowing into thermal storage tank 34 is greater than or equal to the temperature of heating fluid stream 36 discharged from thermal storage tank 34, assuming little to no heat loss and a well-insulated thermal storage tank. In an example, the temperature of heating fluid stream 36 can be about 180° C., such as 180.8° C., and the temperature of intermittent header 34 can be equal to or greater than about 180° C.

Heating fluid stream 36 from thermal storage tank 34 is joined with heating fluid header 30 from sub-network A to form heating fluid stream 38. In some cases, the volume of heating fluid stream 36 can be smaller than the volume of heating fluid header 30. For instance, heating fluid stream 36 can be less than about 50% of the FCp of heating fluid header 30. Heating fluid stream 38 is used for intra-plant heating in the delayed coking plant. Heat exchanger 11 heats a stripper bottom product 514 (see, for example, FIGS. 6 and 15) for re-boiling of the stripper bottom using heat from heating fluid stream 38. Heating stripper bottom product 514 using heat from heating fluid stream 38 allows the role of a medium pressure steam (MPS) re-boiler 526 to be reduced or eliminated, thus enabling conservation of medium pressure steam in the delayed coking plant. Heat exchanger 12 heats rich sponge oil 136 from a sponge absorber 606 (see, for example, FIGS. 7 and 16) using heat from heating fluid stream 38. Exchange at heat exchangers 11, 12 cools heating fluid stream 38 slightly.

Example thermal loads of the heat exchangers 1-12 in the example combined heat and power system 10 are shown in Table 1. Table 1 also shows the temperature of the heating fluid entering each heat exchanger and the temperature of the heating fluid exiting each heat exchanger (for example, following exchange with a stream in the delayed coking plant).

TABLE 1

Heat exchanger thermal loads and heating fluid temperatures.

| Heat exchanger | Thermal load (Gcal/h) | Entry temp. (° C.) | Exit temp. (° C.) |
|---|---|---|---|
| 1 | 55.7 | 50 | 114 |
| 2 | 10.1 | 50 | 91 |
| 3 | 4.5 | 50 | 72 |
| 4 | 30.45 | 50 | 194 |
| 5 | 11.14 | 50 | 194 |
| 6 | 13.76 | 50 | 181 |
| 7 | 7.80 | 50 | 202 |
| 8 | 63.3 | 50 | 174 |
| 9 | 10.1 | 50 | 235 |
| 11 | 21.8 | 188.9 | 155.9 |
| 12 | 5.74 | 155.9 | 146.7 |

Heating fluid stream 38 is joined with heating fluid header 28 from sub-network B to form heating fluid stream 40. Heating fluid stream 40 leaves the networks of heat exchangers and enters power generation system 50, such as an ORC system. An ORC system is an energy conversion system that uses a flow of an organic fluid, such as refrigerants or hydrocarbons (for example, iso-butane liquid), for power generation. Other types of power generation systems can be used in place of an ORC system in the combined heat and power system 10. Power generation system 50 is powered in part by waste heat recovered from the delayed coking plant by the heating fluid sub-streams described above. This use of recovered waste heat enables efficient, carbon-free power generation by power generation system 50.

The total heat load for heat exchangers 4-7 in sub-network A is, for example, about 63.15 Gcal/h and the temperature of heating fluid header 30 exiting sub-network A is, for example, about 191.2° C. The total heat load for heat exchangers 1-3 in sub-network B can be, for example, 70.3 Gcal/h (higher than that of sub-network A) and the temperature of heating fluid header 28 exiting sub-network B is, for example, about 103.2° C. (lower than that of sub-network A). The total heat load for heat exchangers 8 and 9 is, for example, about 73.4 Gcal/h (higher than that of sub-network A) and the temperature of intermittent header 32 is, for example, about 180° C. (lower than that of sub-network A). In this configuration, heating fluid header 30 has a higher temperature but a lower quantity of heat than both heating fluid header 28 and intermittent header 32. This configuration can have advantages, for example, in enabling efficient heat transfer between high temperature heating fluid stream 38 and stripper bottoms and rich sponge oil at heat exchangers 11, 12.

In power generation system 50, iso-butane liquid 51 (for example, 385 kg/s) at about 4 bar and 29° C., is pumped by a pump 52 to 9.5 bar and fed into an evaporator 56. Evaporator 56 evaporates iso-butane liquid 51 using heat from heating fluid stream 40. The evaporated iso-butane is a saturated gas. In some cases, the available quality of heat in the delayed coking plant does not allow huge superheating of the evaporated iso-butane gas. The iso-butane ORC phase envelope has positive slope and the expansion of iso-butane in a turbine 56 can be in the superheating region. In some cases, additional superheating of the iso-butane in a heat exchanger positioned after the evaporator can be valuable for power generation. For instance, the heat exchanger can use heat recovered from a waste heat stream in the delayed coking plant, such as heat from low pressure steam going to air coolers in the delayed coking plant.

The evaporated iso-butane, heated to 62° C. by evaporator 56, is expanded in a turbine 54 to generate power, for example, 9.8 MW of power. The vapor-phase iso-butane from turbine 54 is condensed into a liquid phase in a condenser 58 from 52° C. to 29° C. by heat exchange with water 59 at 20° C. The condensed liquid iso-butane returns to pump 52.

Following exchange with iso-butane 51 in evaporator 56, heating fluid stream 40 is cooled, for example, to 50° C. The cooled heating fluid stream 40 returns to accumulation tank 20. In some examples, an air cooler 42 can be used to further cool heating fluid stream 40 prior to storage in accumulation tank 20, for example, to allow for management of abnormal situations, such as to close the heat balance of combined heat and power system 10 in the event of a disturbance.

Integrating combined heat and power system 10 into a delayed coking plant, either as a retrofit or as part of a grassroots plant, can enable more efficient operation of the delayed coking plant. The number of heat exchangers used in the delayed coking plant can be reduced by feeding recovered waste heat back into the delayed coking plant using the networks of heat exchangers that form part of combined heat and power system 10. The amount of waste heat and greenhouse gases released into the environment can be reduced accordingly, and thus the delayed coking plant can operate more efficiently. In some examples, a reduction of up to about 13% (for example, at least about 21.5 Gcal/h or at least about 85 MM Btu/h) in consumption of heating utilities by the delayed coking plant can be achieved by implementing the networks of heat exchangers of combined heat and power system 10. Furthermore, integrating combined heat and power system 10 into a delayed coking plant enables carbon-free power generation using recovered waste heat from the delayed coking plant. For instance, up to about 9 MW of power can be generated using recovered waste heat from the delayed coking plant.

Combined heat and power system 10 can be integrated into an existing delayed coking plant as a retrofit or can be integrated into a newly constructed delayed coking plant. A retrofit to an existing delayed coking plant allows the efficiency and power generation advantages offered by combined heat and power system 10 to be accessible with a low-capital investment. Combined heat and power system 10 can make use of existing structure in a delayed coking plant while still enabling waste heat recovery and conversion of waste heat to power. The integration of combined heat and power system 10 into an existing delayed coking plant can be generalizable to plant-specific operating modes.

Sections of a retrofit to a delayed coking plant are depicted in FIGS. 2-9. In FIGS. 2-9, temperatures and thermal duties are shown as boxed or circled numbers, respectively.

Figure 3:
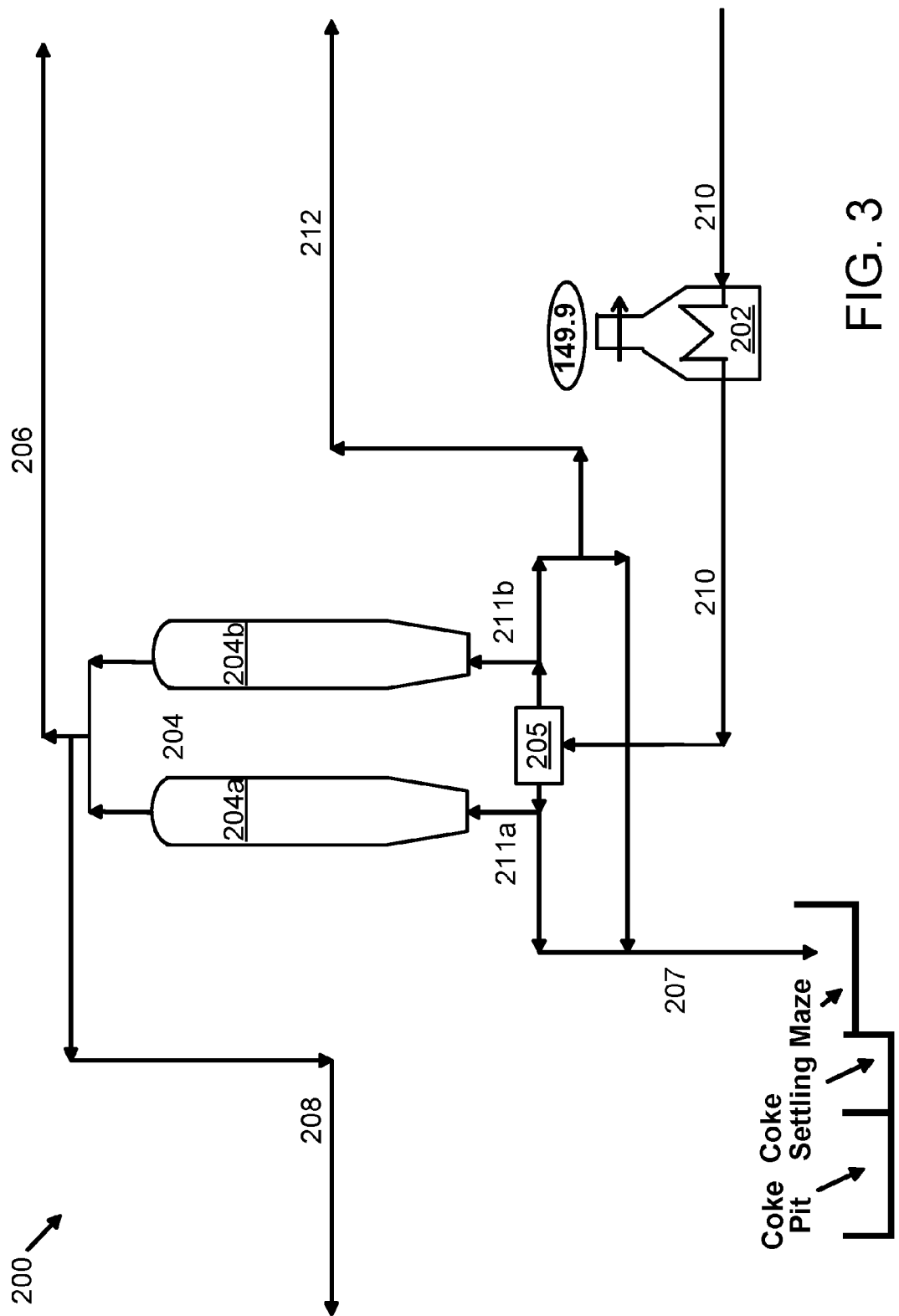
FIG. 3 is a diagram of a retrofit of a coking section of a delayed coking plant.

FIG. 3 shows a coking section 200 of a delayed coking plant that has been retrofit to incorporate the network of heat exchangers described supra. Coking section 200 includes one or more pairs of coke drums 204, in which a vapor-liquid mixture that makes up a feed stream 210 into coke drums 204 is converted into petroleum coke 207 and light hydrocarbon vapors 206 (sometimes referred to as overhead vapors 206). In the example of FIG. 2, coking section 200 includes two coke drums 204a, 204b. In some examples, coking section 200 can include two pairs of coke drums 204, three pairs of coke drums 204, or more than three pairs of coke drums 204.

Coking section 200 operates as a batch-continuous process. Feed stream 210 is a continuous flow that is switched between the two coke drums 204a, 204b by a switch valve 205. Switch valve 205 is connected to each coke drum 204a, 204b via an insulated transfer line 211a, 211b, respectively. In some examples, switch valve 205 is a three-way valve with a port to each coke drum 204a, 204b and a port to a recirculation line that returns to a fractionator 102 (FIG. 1), for use during startup and shutdown of the coking section. While one coke drum (for example, coke drum 204a) is online for coking and receiving feed stream 210, the other coke drum (for example, coke drum 204b) is offline for de-coking. Periodically, coke drum 204a is switched offline for de-coking and coke drum 204b is switched online to receive feed stream 210.

Feed stream 210 is received from the bottom of fractionator 102 (FIG. 2). In some examples, feed stream 210 is received in coking section 200 at a temperature that is too low for coke formation. Feed stream 210 can be pumped by a heater charge pump (not shown) through a coker heater 202 prior to being fed into coke drum 204. Coker heater 202 rapidly heats feed stream 210 to a temperature appropriate for coke formation in the coke drum. For instance, coke heater 202 can heat feed stream 210 to a thermal cracking temperature of between about 480° C. and about 510° C. In some examples, steam can be injected into the heater coils of coker heater 202 in order to maintain a target minimum velocity and residence time of feed stream 210 in coker heater 202, thus suppressing the formation of coke in coker heater 202.

Referring also to FIG. 2, overhead vapors 206 from coke drums 204 are fed into a fractionator 102 in a retrofit fractionation section 100 of the delayed coking plant. Overhead vapors 206 enter below a shed section of fractionator 102. A circulating heavy cracked gas oil (HCGO) pumparound stream 90 from a pumparound pan of a debutanizer 605 re-boiler (FIG. 7) is pumped into a tray wash section of fractionator 102, which is above the shed section. HCGO pumparound stream 90 is used to remove heat from fractionator 102, thus condensing heavy gas oil and cooling the vapors that ascend through fractionator 102. For instance, HCGO pumparound stream 90 quenches and washes overhead vapors 206, cleaning and cooling the vapors and condensing a recycle stream. The recycle stream exits the bottom of fractionator 102 as a portion of feed stream 210 that is fed into coker section 200. For instance, feed stream 210 can be pumped by a heater charge pump (not shown) through coker heater 202 (FIG. 3). Feed stream 210 can also include condensed recycled crude 103 that is fed into the bottom of fractionator 102. Recycled crude 103 can include hot vacuum reduced crude from a vacuum distillation unit. Recycled crude 103 can include cold crude, for example, from a tank storage, that is preheated by a heat exchanger 105, by a heat exchanger 107, or by both heat exchangers 105, 107 prior to entering the bottom of fractionator 102. The bottom of fractionator 102 can act as a reservoir that provides surge capacity for excess recycled crude 103 or excess overhead vapors 206 from coking section 200.

HCGO pumparound stream 90 is withdrawn from fractionator 102 and flows through heat exchanger 13, where feed stream 210 is heated with recovered waste heat from HCGO pumparound stream 90. The heating of feed stream 210 at heat exchanger 13 enables feed stream 210 to enter coker heater 202 at a higher temperature than it would have prior to the retrofit (for example, about 300° C. in the retrofit versus a lower temperature, such as about 280° C. prior to the retrofit). The higher temperature of feed stream 210 thus enables fuel savings in coker heater 202 and allows coker heater 202 to have a lower thermal load (for example, 149.9 Gcal/h in the retrofit versus 162.6 Gcal/h prior to the retrofit).

After waste heat from HCGO pumparound stream 90 is recovered at heat exchanger 13, HCGO pumparound stream 90 can be used to preheat recycled crude 103 via heat exchanger 107. HCGO pumparound stream can also be used to reboil debutanizer 605 (FIG. 7) via a heat exchanger 618.

Prior to the retrofit of the delayed coking plant, HCGO pumparound stream 90 was in some cases used to contribute to the generation of medium pressure steam (MPS) 702 from boiler feed water (BFW) 725 via a heat exchanger 712 in a steam generation section 700 (FIG. 8) of the delayed coking plant. In the retrofit delayed coking plant, heat exchanger 712 is not used for steam generation and HCGO pumparound stream can bypass steam generation section 700. In some examples, steam can be generated in a convection section of coker heater 202. A common steam drum can be used, and circulation through a steam-generating coil of coker heater 202 can be provided by a boiler feed water circulating pump.

The washed, cooled vapors in fractionator 102 pass through a rectifying section of fractionator 102, where the vapors are separated into gases, gasoline, diesel, HCGO, and recycle. In some examples, an oversized fractionator can be used to increase or maximize the amount of diesel product and to reduce or minimize the amount of HCGO sent to other refinery plants (for example, fluid catalytic cracking).

Figure 8:
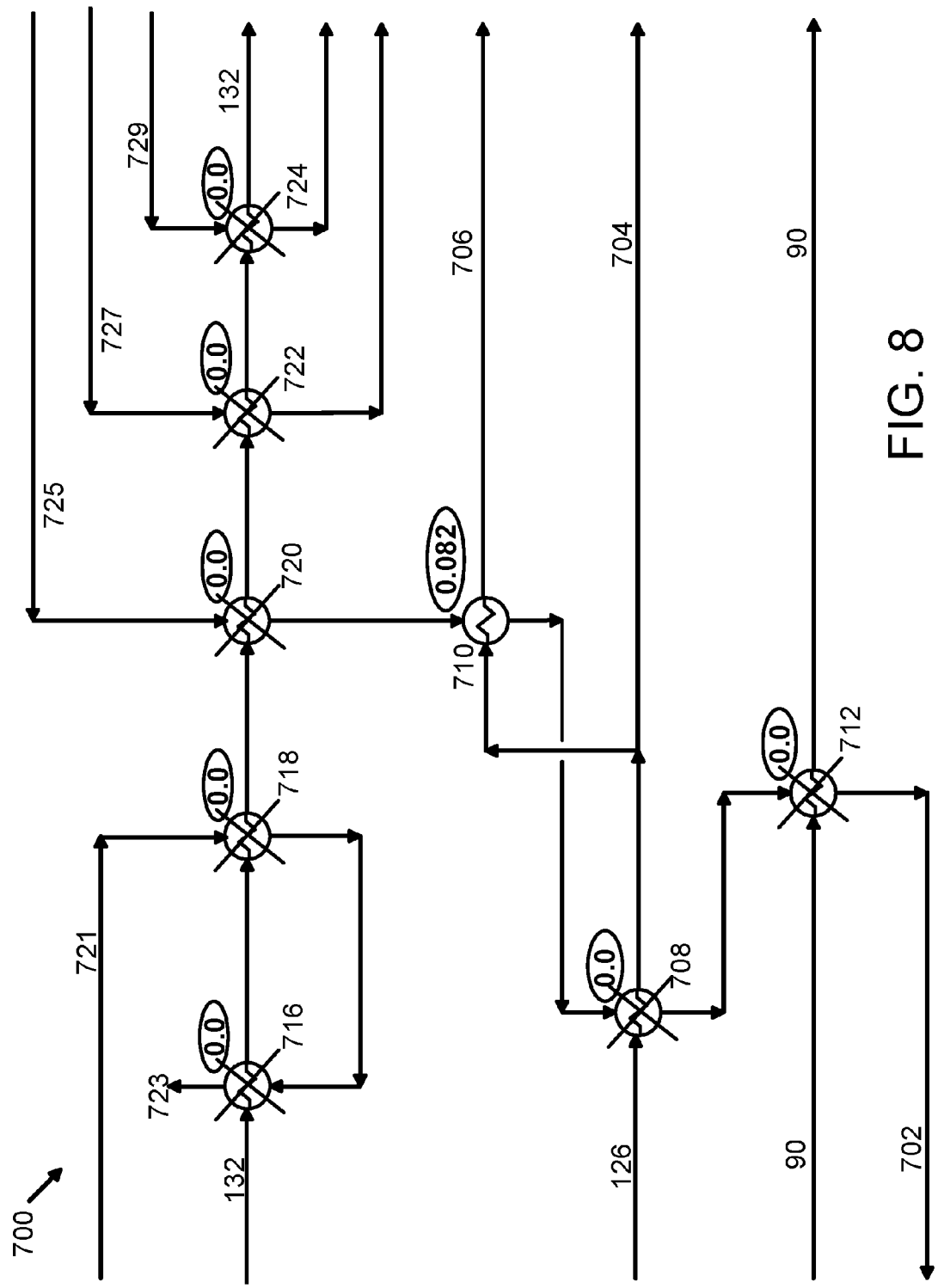
FIG. 8 is a diagram of a retrofit of a steam generation section of a delayed coking plant.

HCGO product 120 exiting fractionator 102 can be stripped by an HCGO stripper 124 to remove light ends 128, which are returned to fractionator 102. The remaining HCGO product 126 can be partially cooled through exchange with recycled crude 103 via heat exchanger 105. In some cases, HCGO product can be filtered, for instance by a backwash filter. Referring to FIG. 8, a portion 706 of HCGO product 126 can be further cooled in steam generation section 700 via a heat exchanger 710, contributing to the generation of medium pressure steam 702 from BFW 725, and directed to a seal oil filter.

Figure 9:
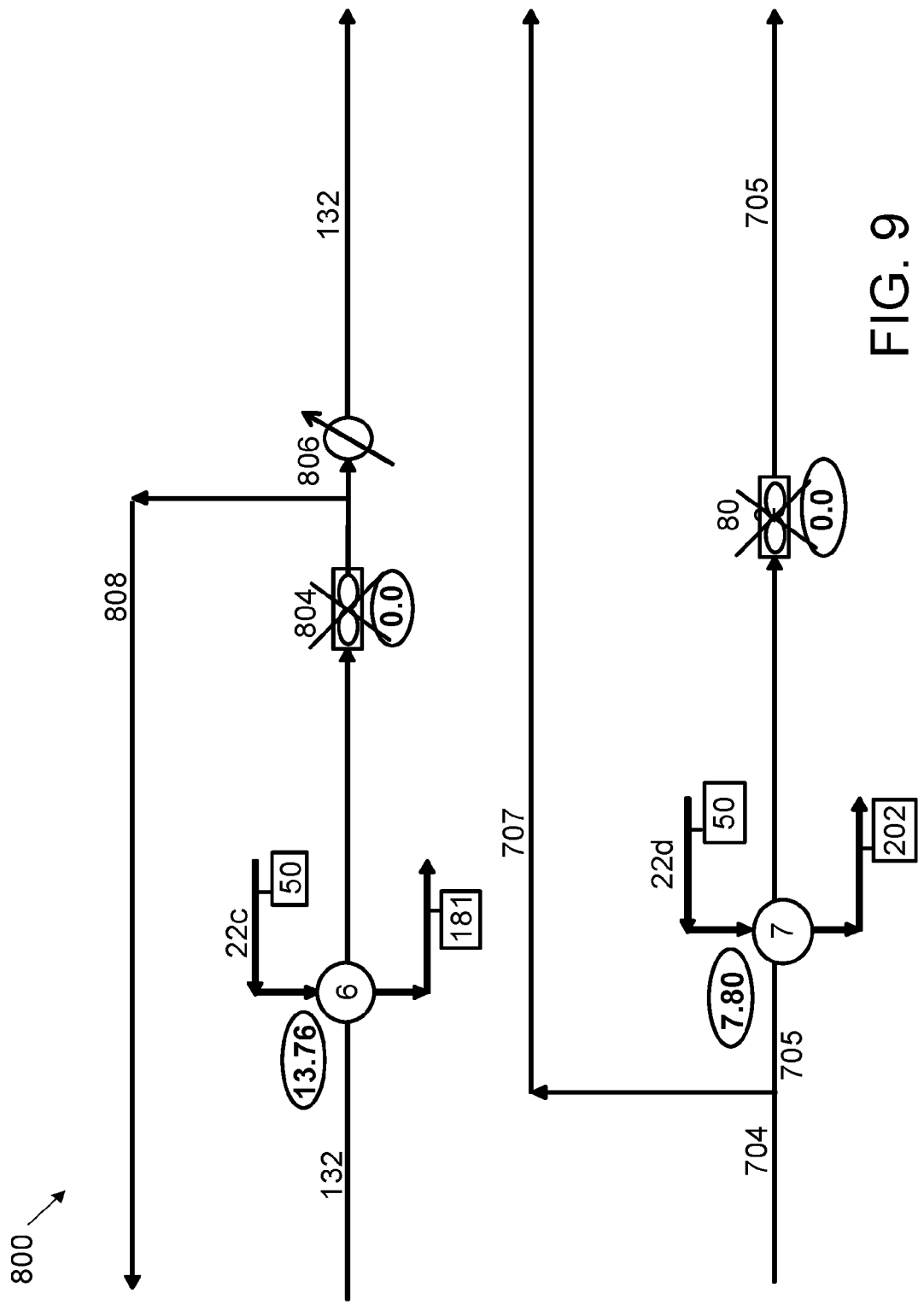
FIG. 9 is a diagram of a retrofit of a rundown cooler section of a delayed coking plant.

Referring also to FIG. 9, a portion 704 of HCGO product 126 is processed in rundown cooler section 800. A first portion 705 passes through heat exchanger 7, which recovers waste heat from the HCGO product 704 and uses the recovered waste heat to heat heating fluid sub-stream 22d. The HCGO product 704 is cooled to storage temperature (for example, 90° C.) and sent to a storage. With the presence of heat exchanger 7, an air cooler 802 used to cool HCGO product 704 prior to the retrofit is no longer used except, for example, for management of abnormal situations. A second portion 707 of HCGO product is sent to other units of the delayed coking plant.

Referring again to FIG. 2, light coked gas oil (LCGO) product 122 exiting fractionator 102 can be stripped by an LCGO stripper 130 to remove light ends 134, which are returned to fractionator 102. The remaining LCGO product 132 can be partially cooled through exchange with recycled crude via a heat exchanger (not shown). Referring to FIG. 9, LCGO product 132 can be pumped to rundown cooler section 800, where heating fluid sub-stream 22c is heated in heat exchanger 6 with recovered waste heat from LCGO product 132. A portion 808 of the cooled LCGO product 132 is sent to a flushing oil coalescer. Another portion of the cooled LCGO product 132 is condensed in a condenser 806 and sent to a storage. With the presence of heat exchangers 6, an air cooler 804 used to cool LCGO product 132 prior to the retrofit is no longer used except, for example, for management of abnormal situations.

Prior to the retrofit, LCGO product 132 was cooled in steam generation section 700 via one or more heat exchangers 716, 718, 720, 722, 724 (FIG. 8) in order to, for example, heat a BFW stream 721 to generate low pressure steam (LPS) 723; heat a BFW stream 725, contributing to the generation of MPS 702; heat a BFW stream 727 received from a naphtha product BFW trim cooler and destined for a boiler; or heat a TWA stream 729 received from a naphtha product TWA trim cooler and destined for a deaerator. With the presence of heat exchanger 6 to recover waste heat from LCGO product 132 in the rundown cooler section, the heat exchangers 716, 718, 720, 722, and 724 are no longer used.

Figure 7:
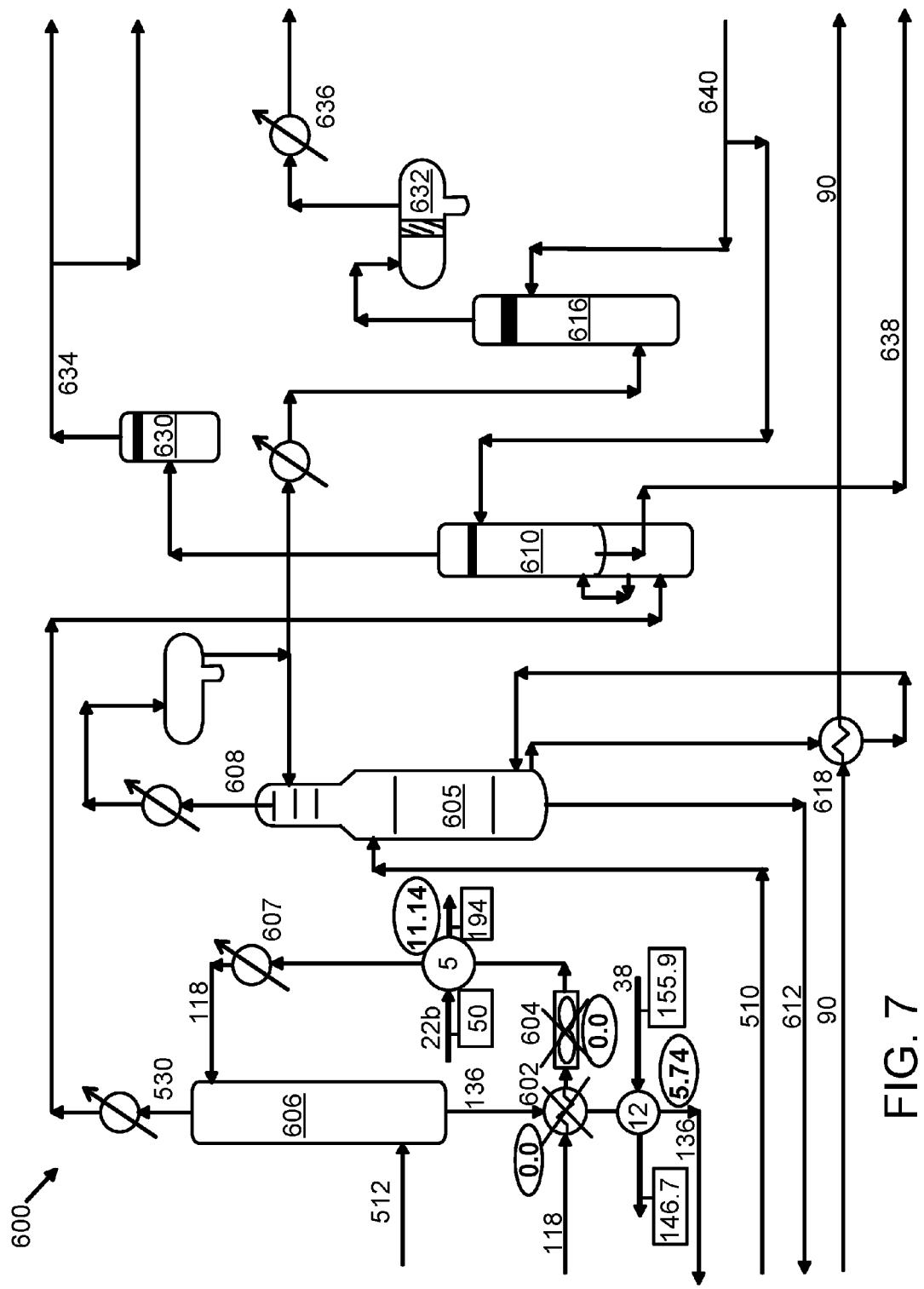
FIG. 7 is a diagram of a retrofit of a sponge absorber section of a delayed coking plant.

Referring again to FIG. 2, lean sponge oil 118 can be withdrawn from a lean sponge oil draw-off tray of fractionator 102 and pumped into a sponge-oil system 600. Referring to FIG. 7, in sponge-oil system 600, heat exchanger 5 recovers waste heat from lean sponge oil 118, which is used to heat heating fluid sub-stream 22b. With the presence of heat exchanger 5, an air cooler 604 used to cool lean sponge oil 118 prior to the retrofit is no longer used except, for example, for management of abnormal situations. The cooled lean sponge oil 118 flows to the top of sponge absorber 606, in some cases passing through a heat exchanger 607 for further cooling before entering sponge absorber 606. Absorber overhead 512 from an absorber 502 (FIG. 6, discussed below) is also fed into sponge absorber 606. Rich sponge oil 136 exits the bottom of sponge absorber 606, is preheated by exchange with heating fluid stream 38 via heat exchanger 12, and is returned to a heat transfer tray of fractionator 102. With the presence of heat exchanger 12, a heat exchanger 602, which enabled preheating of rich sponge oil 136 by exchange with lean sponge oil 118 prior to the retrofit, is no longer used.

Referring again to FIG. 2, waste heat from overhead 140 from fractionator 102 is recovered and used to heat heating fluid sub-stream 24a in heat exchanger 1 (in sub-network B). With the presence of heat exchanger 1, an air cooler 142, used to cool overhead 140 prior to the retrofit, is no longer used except, for example, for management of abnormal situations. The cooled overhead 140 is partially condensed in an overhead condenser 144. The partially condensed overhead 140 flows into a fractionator overhead drum 146, such as a reflux drum, where vapors are separated from condensed hydrocarbon liquid. Vapor 116 exits overhead drum 146 and flows under pressure control to the suction of a gas compressor 404 (FIG. 5) in a vapor recovery unit. The liquid, which can include unstabilized naphtha, is separated into two streams. A first portion 107 of the liquid is refluxed with the top of fractionator 102 and sent along with vapor 116 to the gas compressor 404. A second portion 108 is pumped to an absorber 502 in the vapor recovery unit 500. Sour water (not shown) is withdrawn from overhead drum 146 and pumped to a treating facility.

Referring to FIG. 4, a retrofit blowdown section 300 of the delayed coking plant recovers hydrocarbon and steam vapors that are generated during quenching and steaming of coke drums 204. Use of blowdown section 300 can help to reduce or minimize air pollution generated during operation of the delayed coking plant. During cooling of coke drum 204 for de-coking processing, steam and wax tailings 208 (FIG. 3) from coke drum 204 flow to a coker blowdown tower 302 in blowdown section 300. Coke condensate 212 from coke drum 204 flows to a coke condensate drum 315 in blowdown section 300, and from coke condensate drum 315 into coker blowdown tower 302.

In coker blowdown tower 302, steam and wax tailings 208 and coke condensate 212 are condensed by contact with a cooled circulating oil stream 303. A bottom stream 312 including the wax tailings, diluted by light gas oil in the circulating oil stream 303, is withdrawn from the bottom of coker blowdown tower 302. A first portion 312a of bottom stream 312 is cooled by exchange with medium pressure steam 311 (for instance, from a steam network in the refinery) via a cooler 309. A second portion 312b of bottom stream 312 passes through heat exchanger 9, which heats heating fluid sub-stream 26b with recovered waste heat from bottom stream 312b. The cooled portions 312a, 312b of bottom stream 312 are recirculated back to coker blowdown tower 302 as part of the circulating oil stream 303. Excess oil can be returned to fractionator 102.

An overhead stream 314 including steam and light hydrocarbons from the top of coker blowdown tower 302 passes through heat exchanger 8, which heats heating fluid sub-stream 26a with recovered waste heat from overhead stream 314. Cooled overhead stream 314 exits heat exchanger 8 and is condensed in a blowdown condenser (not shown) and fed into a blowdown settling drum 306. In blowdown settling drum 306, oil is separated from condensate. The oil is pumped to refinery slop. Water 320 (for example, sour water) is pumped to treating facilities, such as a sour water stripper, or to a decoking-water storage tank for reuse. A vent gas 318 from blowdown settling drum 306, for example, including light hydrocarbon vapors, is compressed in a vent-gas compressor (not shown) and separated from the condensed liquid in a vent-gas knockout drum (not shown). In some examples, the recovered vent gas 318 flows to fractionator overhead drum 146 (FIG. 2). In some examples, the recovered vent gas 318 is sent to a fuel gas recovery system. Blowdown 322 from coker blowdown tower 302 is quenched and send to coke drums 204 (FIG. 3).

In the retrofit blowdown section 300, heat exchangers 8, 9 enable waste heat to be recovered from the intermittent overhead and bottom streams 314, 312, respectively, from coker blowdown tower 302. Heat exchangers 8, 9 can operate intermittently. For instance, heat exchanger 8 can operate for at least about 5 hours per day and the heat exchanger 9 can operate for at least about 8 hours per day. Prior to the retrofit of blowdown section, bottom stream 312 and overhead stream 314 were in some cases cooled via air coolers 308, 316, respectively. With the presence of heat exchangers 8, 9, air coolers 308, 316 are no longer used except, for example, for management of abnormal situations.

Figure 5:
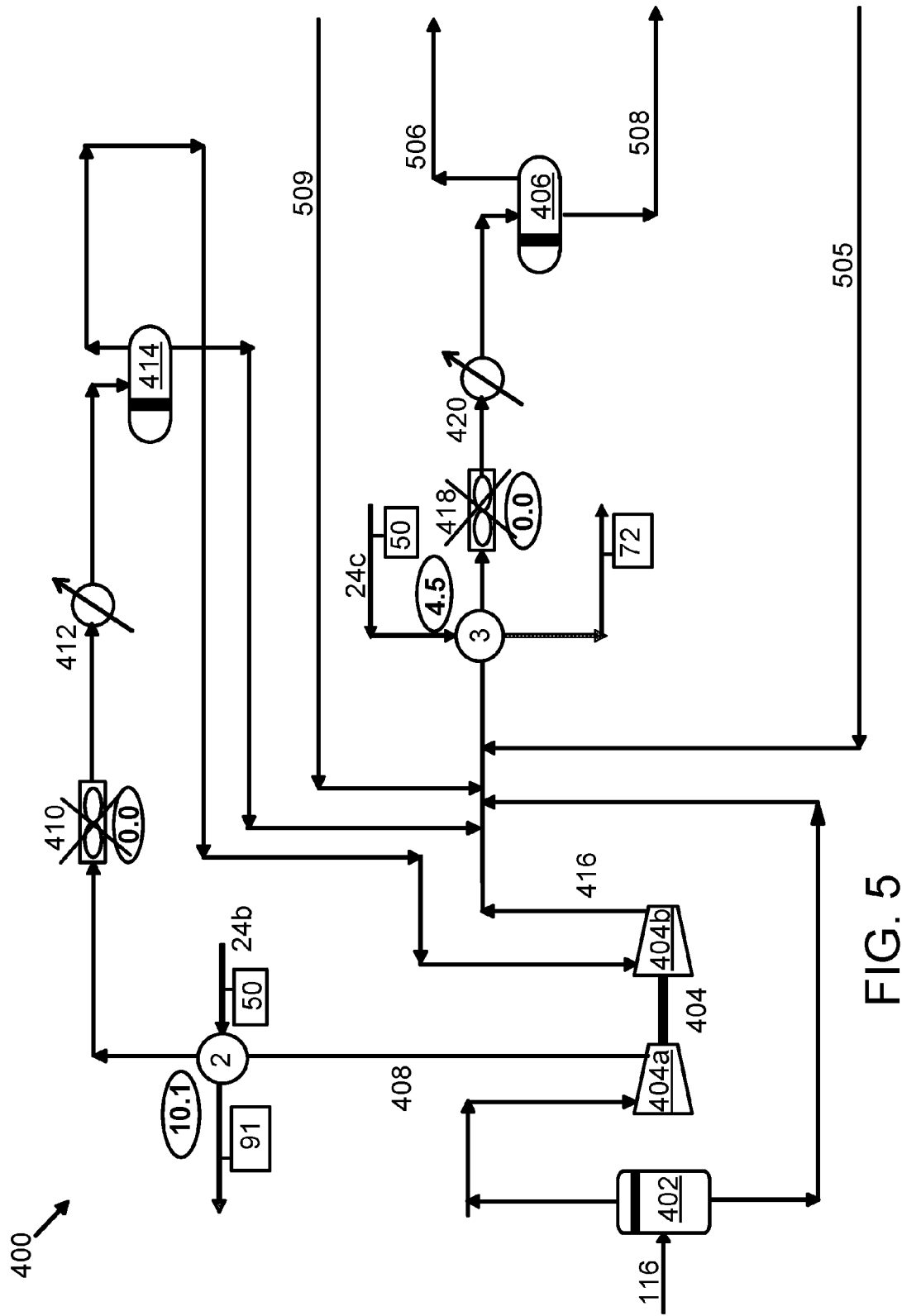
FIG. 5 is a diagram of a retrofit of an overhead gas compression system of a delayed coking plant.

Referring to FIGS. 5-7, an overhead gas compression system 400, an absorber-stripper section 500, and sponge absorber section 600 make up the vapor recovery unit of the delayed coking plant. The vapor recovery unit processes vapor 116 and liquid 108 from fractionator overhead drum 146. FIGS. 5-7 show retrofits of gas compression system 400, absorber-stripper section 500, and sponge absorber section 600.

Referring to FIG. 5, in the retrofit of overhead gas compression system 400, heat exchangers 2, 3 enable waste heat to be recovered from compressor inter-stage stream 408 and compressor discharge stream 416, respectively. In overhead gas compression system 400, vapor 116 from fractionator overhead drum 146 is compressed and cooled by a compressor suction knockout drum 402 and a coker gas compressor 404. Coker gas compressor 404 is a two-stage compressor with the stages connected by an inter-stage stream 408. Inter-stage stream 408 exits a first stage 404a of coker gas compressor 404 and passes through heat exchanger 2, which heats heating fluid sub-stream 24b with waste heat from inter-stage stream 408. Cooled inter-stage stream 408 is compressed in a compressor 412 and fed into a compressor inter-stage drum 414. Inter-stage stream 408 flows from compressor inter-stage drum 414 into a second stage 404b of coker gas compressor 404. A compressor discharge stream 416 exiting from the second stage 404b of coker gas compressor 404 passes through heat exchanger 3, which heats heating fluid sub-stream 24c with waste heat from compressor discharge stream 416. Cooled compressor discharge stream 416 is compressed in a compressor 420 and fed into an absorber stripper feed drum 406. From absorber stripper feed drum 406, a vapor stream 506 is fed into the bottom of an absorber 502 (FIG. 6) and a liquid stream 508 is pumped into the top of a stripper 504.

Prior to the retrofit of overhead gas compression system 400, inter-stage stream 408 and compressor discharge stream 416 were in some cases cooled via air coolers 410, 418, respectively. With the presence of heat exchangers 2, 3, air coolers 410, 418 are no longer used except, for example, for management of abnormal situations.

Referring to FIG. 6, in the retrofit of absorber-stripper section 500, heat exchanger 4 enables waste heat to be recovered from the stabilized naphtha stream 612 from the bottom of the debutanizer 605 (FIG. 7). Liquid 108, such as unstabilized naphtha, from fractionator overhead drum 146 flows directly into the top of an absorber 502. Absorber 502 and a stripper 504 produce a bottoms stream 510 that contains most of the C3 and heavier material in the feed processed by absorber 502 and stripper 504. An overhead 512 from absorber 502 contains the C2 and lighter material in the feed, along with some unrecovered C3 and heavier material. Overhead 509 from stripper 504 and bottoms 505 from absorber 502 are returned to absorber stripper feed drum 406 (FIG. 5).

Referring also to FIG. 7, overhead 512 from absorber 502 is fed into a sponge absorber 606, where unrecovered C3 and heavier material is recovered and recycled back to fractionator 102 as rich sponge oil 136. The C2 and lighter material in overhead 512 exits through the top of sponge absorber 606 as an overhead 530 and is processed by a treating section for removal of compounds such as hydrogen sulfide, mercaptans, or other sulfur compounds, as described in more detail below. In some examples, sponge absorber 606 can use a side cut from fractionator 102 as an absorbing medium.

Bottoms stream 510 from stripper 504 is pumped to a debutanizer 605, which removes C3 and C4 as an overhead distillate 608 and leaves stabilized naphtha 612 as a bottoms product. Stabilized naphtha 612 can be sent to storage or can be further processed. For instance, referring again to FIG. 6, which shows a retrofit of an absorber-stripper section 500, stabilized naphtha 612 can pass through heat exchanger 4, which heats heating fluid sub-stream 22a with recovered waste heat from stabilized naphtha stream 612. The cooled stabilized naphtha 612 exiting heat exchanger 4 is compressed in a compressor 524 and joined with liquid 108 from fractionator overhead drum 146 to be fed into the top of absorber 502. Heat exchanger 11 uses the heat from heating fluid stream 38 to heat up or vaporize stripper bottom product 514.

Prior to the retrofit of absorber stripper section 500, stabilized naphtha 612 was used to re-boil stripper bottom product 514 via a heat exchanger 516, cooled by exchanged with boiler feed water (BFW) 528 via a heat exchanger 518, cooled by exchange with tempered water (TWA) 532 via a heat exchanger 520, and cooled in an air cooler 522. With the presence of heat exchanger 4, heat exchangers 516, 518, 520, and air cooler 522 are no longer used except, for example, for management of abnormal situations. In addition, prior to the retrofit of absorber stripper section 500, stripper bottom product 514 was re-boiled with medium pressure steam (MPS) re-boiler 526, which is no longer used with the presence of heat exchanger 11.

Referring again to FIG. 7, overhead distillate 608 from debutanizer 605, which can be, for example, C3-C4 liquefied petroleum gas (LPG), goes to a treating section for removal of compounds such as hydrogen sulfide, mercaptans, or other sulfur compounds. The treating section can include one or more condensers, a coker product gas scrubber 610, a sour gas knockout drum, an amine absorber (such as a liquid-liquid contactor 616, for instance, a C3-C4 amine contactor), an amine knockout drum 630, and a settling drum 632 (for instance, a C3-C4 amine settling drum), and can make use of lean diethanolamine 640 received from an amine regeneration unit. Outputs from the treating section are sent to various destinations. Fuel gas 634 output as an overhead stream from amine knockout drum 630 is sent to heaters, a fuel gas knockout drum, and a fuel gas header. C3/C4 product 636 from settling drum 632 is sent to an LPG mercaptan oxidation (merox) unit. Rich DEA 638 from the bottom of coker product gas scrubber 610 is processed in an amine regeneration unit.

In some examples, one or more of the heat exchangers added in the retrofit of the delayed coking plant can be implemented with a thermal duty less than that shown in the figures. A subsequent, second retrofit can be conducted to increase the thermal duty of one or more of the heat exchangers, for example, by adding surface area or heat transfer enhancements to heat exchangers. In some examples, air coolers that are shown as no longer used in the retrofit can be used if one or more of the heat exchangers has a thermal duty less than that shown in the figures.

Figure 10:
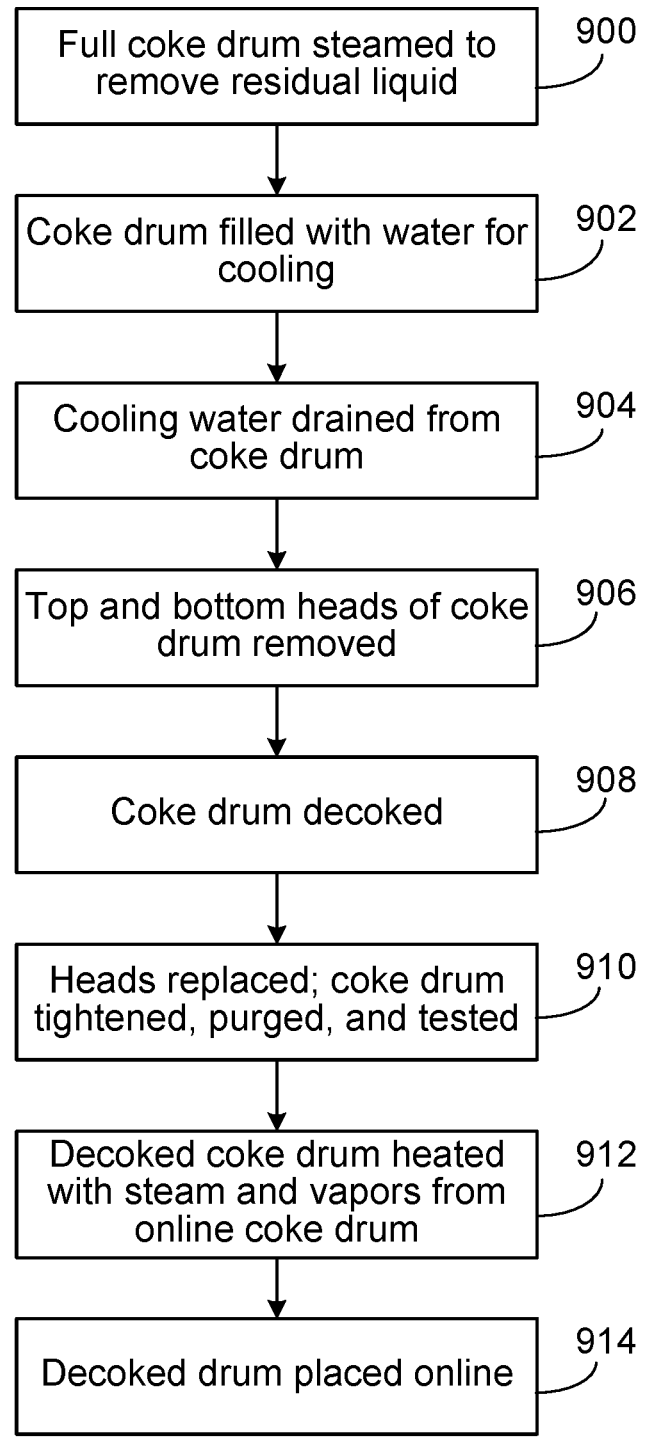
FIG. 10 is a flow chart.

Referring to FIG. 10, in a decoking operation, a full coke drum (for example, coke drum 204b in FIG. 2) is steamed out to remove any residual-oil liquid (900). The resulting mixture of steam and hydrocarbon is sent first to fractionator 102 as a stream of overhead vapors 206 and later to coker blowdown section 300, where wax tailings 208 are recovered. The coke drum is filled with water, allowing the drum to cool below 93° C. (902). The steam generated during cooling of the coke drum is condensed in coker blowdown section 300. The cooling water is drained from the coke drum and recovered for reuse (904).

The top and bottom heads of the coke drum are removed in preparation for coke removal (906), and the coke drum is decoked (908). In some examples, the coke drum is decoked via hydraulic decoking, in which high-pressure water jets are used to cut the coke from the coke drum. The water is separated from the coke fines and reused.

The top and bottom heads of the coke drum are replaced and the coke drum is tightened, purged, and pressure-tested (910). Steam and vapors from the hot coke drum (for example, coke drum 204a) are used to heat up the cold, decoked coke drum (912). Condensed water is sent to coker blowdown tower 302 and condensed hydrocarbons are sent to either fractionator 102 (as feed 206) or coker blowdown tower 302 (as wax tailings 208). The heated, decoked coke drum is placed online to receive the feed stream (914) and the decoking cycle is repeated for the other coke drum. In some examples, a 36-hour coking cycle can be used in which each drum is coked for 18 hours and decoked for 18 hours. In some examples, a shorter coking cycle can be used, such as 11 hours, 14 hours, or 16 hours. Shorter coking cycles can enable increased unit throughput by filling the coke drums 204 more quickly.

Coke that has not yet been calcined for removal of excess moisture and volatile matter is referred to as "green" coke. Green coke can be calcined in a variety of ways, such as a rotary-kiln method or a rotary-hearth method. In the rotary-kiln method, after draining, the coke is charged to a crusher and then to one or more kiln feed bins. The rate of charge to the kiln is controlled by a continuous-weigh feeder. In the kiln, the residual moisture and the volatile matter are removed as the green coke moves counter to the heat flow. Process heat is supplied to the kiln through a burner. Another source of process heat is combustion of the volatile matter released by the green coke in the kiln. The calcined coke leaving the kiln is discharged into a rotary cooler, where the coke is quenched with direct water sprays or streams of ambient air. The calcined, cooled coke is conveyed from the rotary cooler to storage.

FIGS. 11-17 show details of a grassroots delayed coking plant that includes the heat exchangers of combined heat and power system 10.

FIG. 11 shows a grassroots fractionation section 180. A heat exchanger 13 enables heat exchange between feed stream 210 (to be heated) and HCGO pumparound stream 90 (to be cooled). HCGO pumparound stream 90 flows through heat exchanger 13, through heat exchanger 107, and then directly to heat exchanger 618 (FIG. 17) for re-boiling of the debutanizer bottom.

Figure 12:
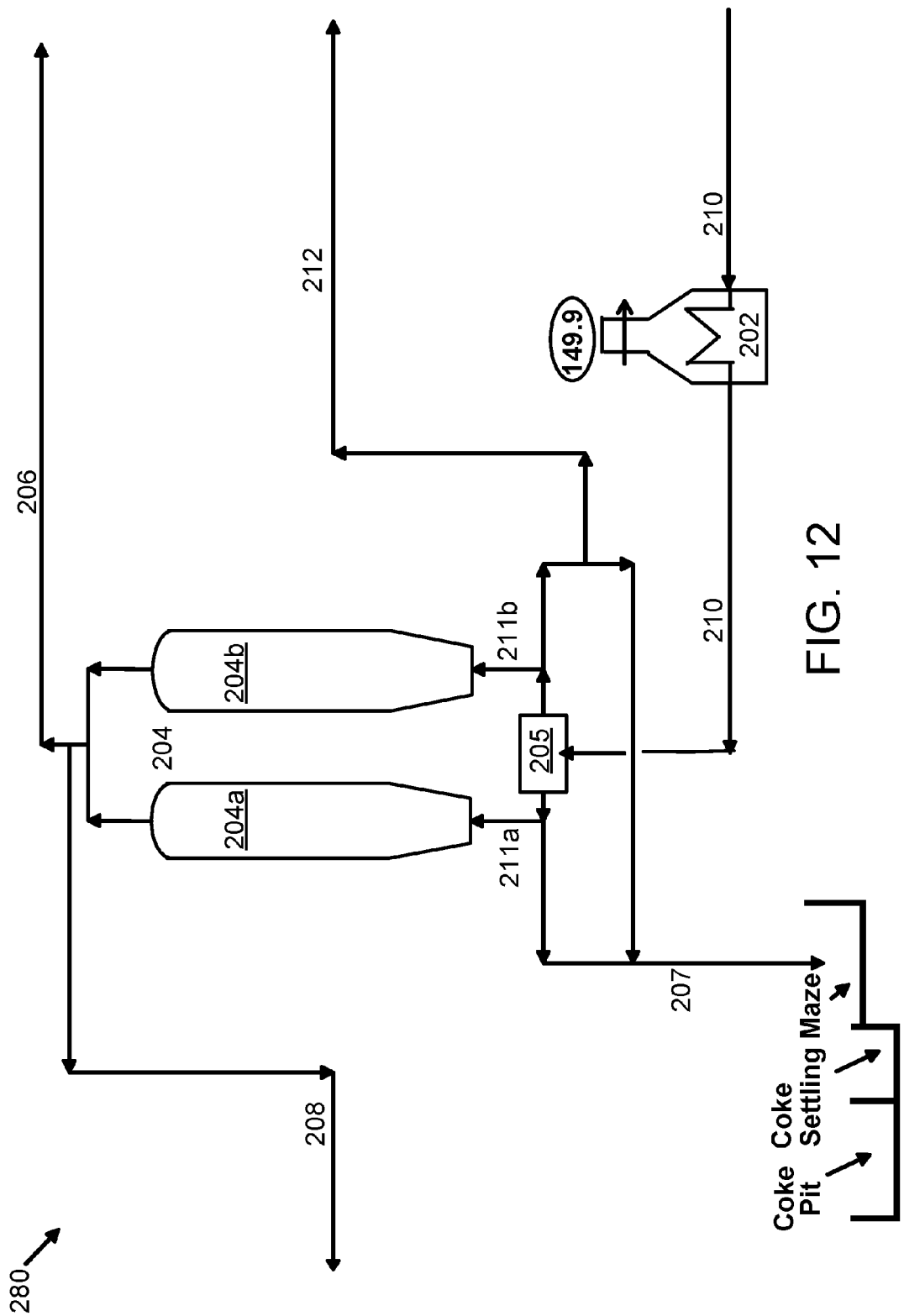
FIG. 12 is a diagram of a grassroots coking section of a delayed coking plant.

Referring also to FIG. 12, heating feed stream 210 with waste heat from HCGO pumparound stream 90 enables feed stream 210 to enter coker heater 202 at a high temperature, thus enabling fuel savings in coker heater 202.

Referring again to FIG. 11, in grassroots fractionation section 180, overhead 140 from fractionator 102 is cooled via exchange with heating fluid sub-stream 24a by heat exchanger 1 (in sub-network B). Waste heat from overhead 140 is used to heat heating fluid sub-stream 24a, and heated fluid sub-stream 24a is combined into heating fluid header 28 of sub-network B 70.

Referring to FIG. 13, in a grassroots blowdown section 380, heat exchangers 8, 9 enable waste heat to be recovered from the intermittent overhead and bottom streams 314, 312, respectively, from coker blowdown tower 302. Heat exchanger 8 heats heating fluid sub-stream 26a with waste heat from overhead stream 314 and heat exchanger 9 heats heating fluid sub-stream 26b with waste heat from bottom stream 312. The two heating fluid sub-streams 26a, 26b are combined into intermittent header 32 of sub-network C 80, which flows into thermal storage tank 34. Heat exchangers 8, 9 operate intermittently. For instance, heat exchanger 8 can operate for at least about 5 hours per day and the heat exchanger 9 can operate for at least about 8 hours per day.

Figure 14:
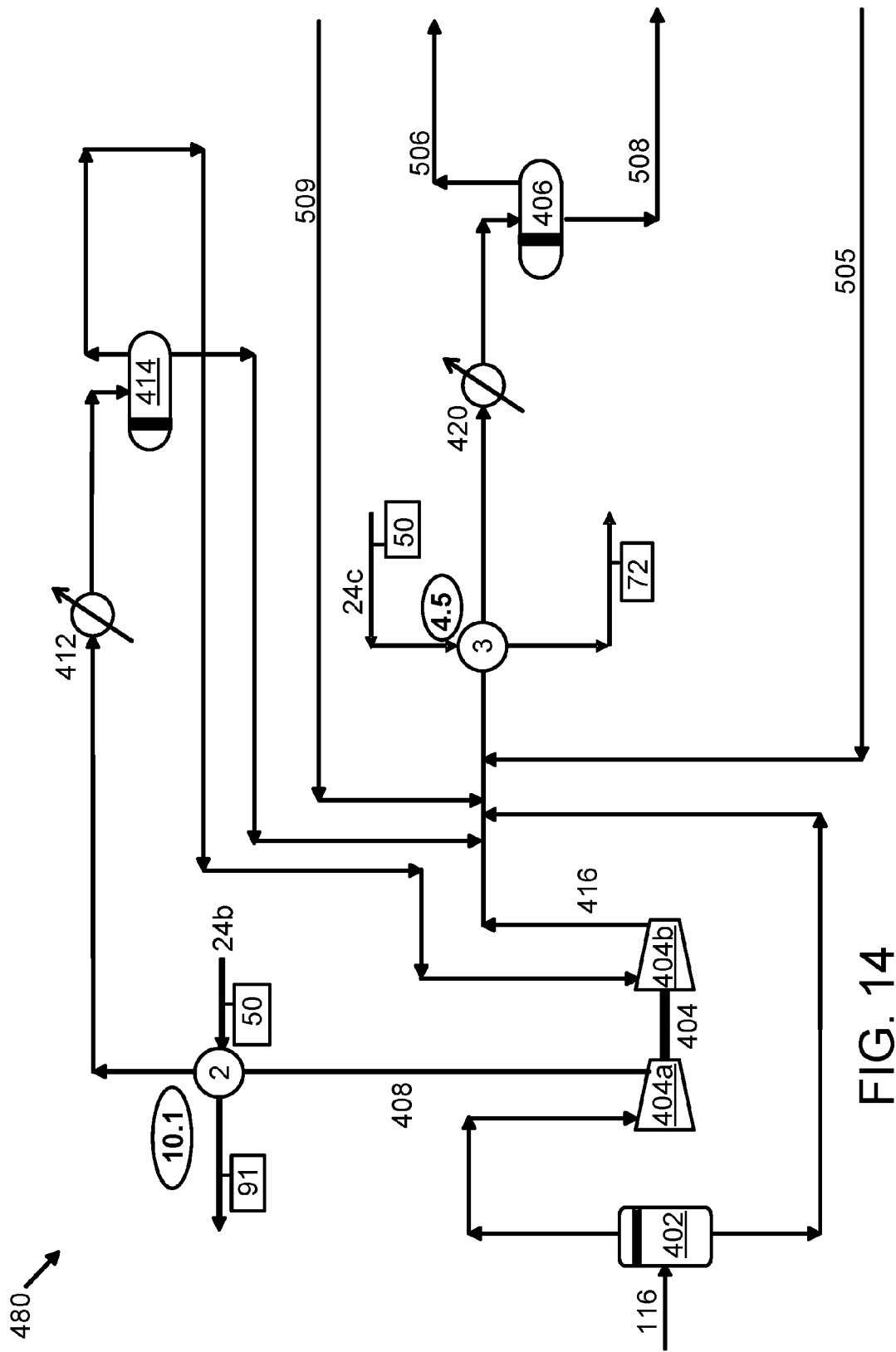
FIG. 14 is a diagram of a grassroots overhead gas compression system of a delayed coking plant.

Referring to FIG. 14, in a grassroots overhead gas compression system 480, heat exchangers 2, 3 enable waste heat to be recovered from compressor inter-stage stream 408 and compressor discharge stream 416, respectively. Heat exchanger 2 heats heating fluid sub-stream 24b with waste heat from compressor inter-stage stream 408 and heat exchanger 3 heats heating fluid sub-stream 24c with waste heat from compressor discharge stream 416. Heated fluid sub-streams 24b, 24c are combined into heating fluid header 28 of sub-network B 70.

Figure 16:
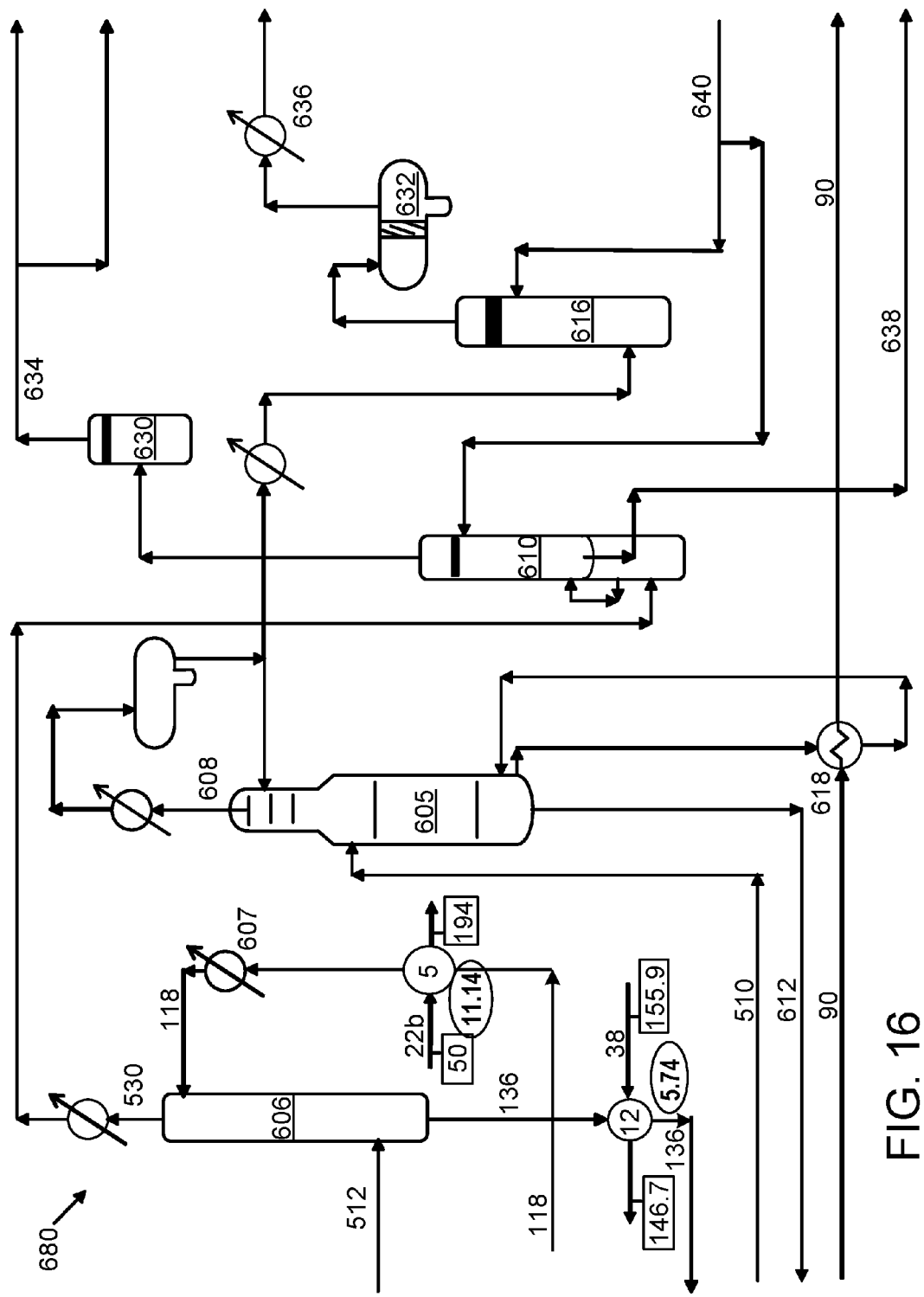
FIG. 16 is a diagram of a grassroots sponge absorber section of a delayed coking plant.

Referring to FIG. 15, in a grassroots absorber-stripper section 580, heat exchanger 4 enables waste heat to be recovered from the stabilized naphtha stream 612 from the bottom of the debutanizer 605 (FIG. 16). Heat exchanger 4 heats heating fluid sub-stream 22a with waste heat from stabilized naphtha stream 612 and heated fluid sub-stream 22a is combined into heating fluid header 30 of sub-network A 60. Heat exchanger 11 uses the heat from heating fluid stream 38 to re-boil stripper bottom product 514.

Referring to FIG. 16, in a grassroots sponge absorber section 680, heat exchanger 5 enables waste heat to be recovered from lean sponge oil stream 118. Heat exchanger 5 heats heating fluid sub-stream 22b with waste heat from lean sponge oil stream 118 and heated fluid sub-stream 22b is combined into heating fluid header of sub-network A 60. Heat exchanger 12 uses the heat from heating fluid stream 38 to heat up rich sponge oil stream 136.

Figure 17:
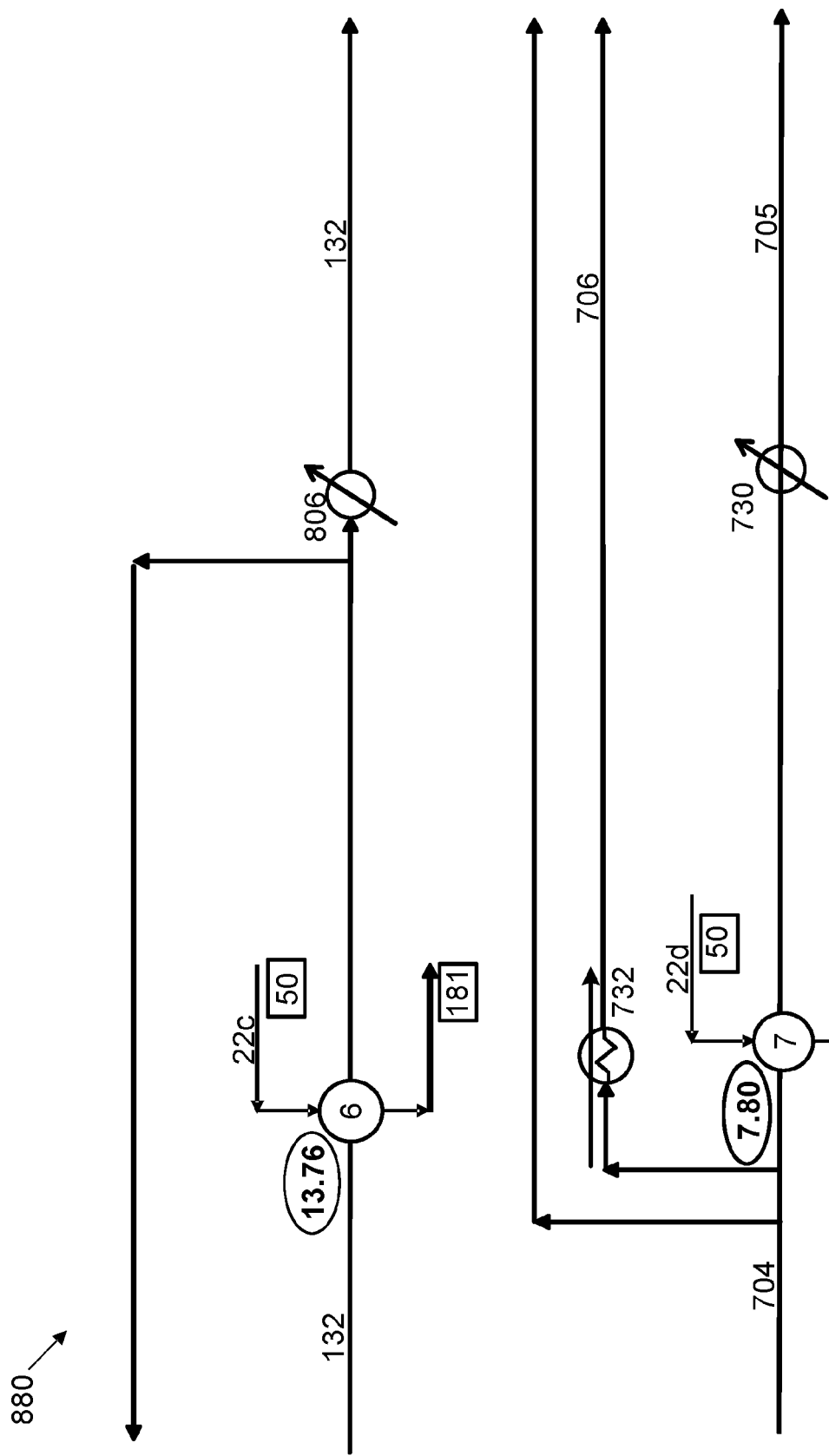
FIG. 17 is a diagram of a grassroots rundown cooler section of a delayed coking plant.

Referring to FIG. 17, in a grassroots rundown cooler section 880, heat exchangers 6, 7 enable waste heat to be recovered from LCGO product 132 and HCGO product 704, respectively. Heat exchanger 6 heats heating fluid sub-stream 22c with waste heat from LCGO product 132 and heat exchanger 7 heats heating fluid sub-stream 22d with waste heat from HCGO product 704. Heated fluid sub-streams 22c, 22d are combined into heating fluid header of sub-network A 60. HCGO product 704 going to storage is further cooled, if necessary, by a water cooler 730. HCGO product 706 going to the seal oil filter is cooled by a heat exchanger 732, for example, by exchange with boiler feed water.

Other implementations are also within the scope of the following claims.

What is claimed is:

1. A system comprising:
   a heat exchange system comprising:
      a first heat exchanger operable as a continuous source of heat from a delayed coking plant, the first heat exchanger configured to heat a first fluid stream to produce a heated first fluid stream;
      a second heat exchanger operable as a continuous source of heat from the delayed coking plant, the second heat exchanger configured to heat a second fluid stream to produce a heated second fluid stream, wherein the heated second fluid stream has a lower temperature and a greater quantity of heat than the heated first fluid stream;
      a third heat exchanger operable as a continuous source of heat to the delayed coking plant, the third heat exchanger configured to heat a third fluid stream to produce a heated third fluid stream, wherein the third fluid stream includes the heated first fluid stream and a hot fluid stream, wherein the heated third fluid stream has a lower temperature than the heated first fluid stream; and
   a power generation system configured to generate power using heat from the heated second fluid stream and the heated third fluid stream.

2. The system of claim 1, further comprising a fluid storage tank configured to receive an intermittent stream of hot fluid and to pass the hot fluid stream continuously.

3. The system of claim 2, further comprising a fourth heat exchanger operable as an intermittent source of heat from the delayed coking plant, the fourth heat exchanger configured to heat a fourth fluid stream to produce the intermittent stream of hot fluid.

4. The system of claim 3, wherein the intermittent hot stream has a greater quantity of heat and a lower temperature than the heated first fluid stream.

5. The system of claim 3, wherein the fourth heat exchanger recovers heat from an output stream from a coker blowdown tower in the delayed coking plant, wherein the output stream is an intermittent heat source.

6. The system of claim 3, wherein the heat exchange system comprises multiple fourth heat exchangers each configured to heat a portion of the intermittent fluid stream, wherein each fourth heat exchanger recovers heat from a corresponding intermittent heat source in the delayed coking plant.

7. The system of claim 1, wherein the first heat exchanger recovers heat from a continuous heat source in the delayed coking plant, the continuous heat source having a temperature of at least about 134° C.

8. The system of claim 1, wherein the first heat exchanger recovers heat from a bottom stream from a debutanizer in the delayed coking plant.

9. The system of claim 1, wherein the first heat exchanger recovers heat from a stream output from a fractionator in the delayed coking plant.

10. The system of claim 1, wherein the heat exchange system comprises multiple first heat exchangers each configured to heat a portion of the first fluid stream, wherein each first heat exchanger recovers heat from a corresponding continuous heat source in the delayed coking plant.

11. The system of claim 1, wherein the second heat exchanger recovers heat from a continuous heat source in the delayed coking plant, the continuous heat source having a temperature of less than about 134° C.

12. The system of claim 1, wherein the second heat exchanger recovers heat from an overhead stream from a fractionator in the delayed coking plant.

13. The system of claim 1, wherein the second heat exchanger recovers heat from an inter-stage stream or a discharge stream of a coker gas compressor in the delayed coking plant.

14. The system of claim 1, wherein the heat exchange system comprises multiple second heat exchangers each configured to heat a portion of the second fluid stream, wherein each second heat exchanger recovers heat from a corresponding continuous heat source in the delayed coking plant.

15. The system of claim 1, wherein the temperature of the heated third fluid stream is less than the temperature of the third fluid stream.

16. The system of claim 1, wherein the third heat exchanger is configured to heat a stripper bottom product from a stripper in the delayed coking plant by exchange with the third fluid stream.

17. The system of claim 1, wherein the third heat exchanger is configured to heat a rich sponge oil stream from a sponge absorber in the delayed coking plant by exchange with the third fluid stream.

18. The system of claim 1, wherein the heat exchange system comprises multiple third heat exchangers each configured to heat a corresponding stream in the delayed coking plant by exchange with a portion of the third fluid stream.

19. The system of claim 1, wherein the power generation system comprises an Organic Rankine cycle system.

20. The system of claim 1, wherein the system is integrated into the delayed coking plant as a retrofit to the delayed coking plant.

21. The system of claim 20, wherein one or more existing heat exchangers in the delayed coking plant are no longer used following the retrofit.

22. The system of claim 20, wherein, following the retrofit, the delayed coking plant uses up to about 13% less in heating utility consumption compared to the heating utility consumption of the delayed coking plant prior to the retrofit.

23. A method comprising:
heating a first fluid stream to produce a heated first fluid stream by exchange with a first continuous source of heat from a delayed coking plant;
heating a second fluid stream to produce a heated second fluid stream by exchange with a second continuous source of heat from the delayed coking plant, wherein the heated second fluid stream has a lower temperature and a greater quantity of heat than the heated first fluid stream;
heating a stream in the delayed coking plant by exchange with a third fluid stream to produce a heated third fluid stream, wherein the third fluid stream includes the heated first fluid stream and a hot fluid stream, wherein the heated third fluid stream has a lower temperature than the heated first fluid stream; and
generating power using heat from the heated second fluid stream and the heated third fluid stream.

24. The method of claim 23, further comprising:
receiving an intermittent hot stream at a fluid storage tank; and
continuously passing the hot fluid stream from the fluid storage tank.

25. The method of claim 24, further comprising heating a fourth fluid stream to produce the intermittent hot stream by exchange with an intermittent source of heat from the delayed coking plant.

26. The method of claim 25, wherein heating the fourth fluid stream comprises heating the third fluid stream using heat recovered from an output stream from a coker blow-down tower in the delayed coking plant, wherein the output stream is an intermittent heat source.

27. The method of claim 23, wherein heating the first fluid stream comprises heating the first fluid stream using heat recovered from a bottom stream from a debutanizer in the delayed coking plant.

28. The method of claim 23, wherein heating the first fluid stream comprises heating the first fluid stream using heat recovered from a stream output from a fractionator in the delayed coking plant.

29. The method of claim 23, wherein heating the second fluid stream comprises heating the second fluid stream using heat recovered from an overhead stream from a fractionator in the delayed coking plant.

30. The method of claim 23, wherein heating the second fluid stream comprises heating the second fluid stream using heat recovered from an inter-stage stream and or a discharge stream of a coker gas compressor in the delayed coking plant.

31. The method of claim 23, wherein heating a stream in the delayed coking plant comprises heating a stripper bottom product from a stripper in the delayed coking plant.

32. The method of claim 23, wherein heating a stream in the delayed coking plant comprises heating a rich sponge oil stream from a sponge absorber in the delayed coking plant.

33. The method of claim 23, wherein generating power comprises generating power using an Organic Rankine cycle system.

34. The method of claim 23, wherein generating power comprises generating at least about 9 MW of power.

35. The method of claim 23, further comprising returning the heated second fluid stream and the heated third fluid stream to an accumulation tank.

* * * * *

UNITED STATES PATENT AND TRADEMARK OFFICE
CERTIFICATE OF CORRECTION

PATENT NO. : 9,725,652 B2  
APPLICATION NO. : 14/991706  
DATED : August 8, 2017  
INVENTOR(S) : Mahmoud Bahy Mahmoud Noureldin and Hani Mohammed Al Saed Page 1 of 1

It is certified that error appears in the above-identified patent and that said Letters Patent is hereby corrected as shown below:

In the Claims

Column 20, Line 36, Claim 30, please delete "and" after "stream".

Signed and Sealed this  
Twentieth Day of October, 2020

Andrei Iancu  
*Director of the United States Patent and Trademark Office*